US008437334B2

(12) United States Patent
Streed et al.

(10) Patent No.: US 8,437,334 B2
(45) Date of Patent: May 7, 2013

(54) METHODS AND APPARATUS FOR METHOD FOR MAINTAINING A RADIO LINK AT A MOBILE RADIO

(75) Inventors: James E. Streed, Barrington, IL (US); Kevin G. Doberstein, Elmhurst, IL (US); Harish Natarahjan, Streamwood, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 340 days.

(21) Appl. No.: 12/957,072

(22) Filed: Nov. 30, 2010

(65) Prior Publication Data

US 2012/0134353 A1 May 31, 2012

(51) Int. Cl.
*H04W 56/00* (2009.01)

(52) U.S. Cl.
USPC ................................. 370/350; 370/347

(58) Field of Classification Search ............. 370/324, 370/347, 350; 714/798
See application file for complete search history.

(56) References Cited

U.S. PATENT DOCUMENTS

| | | | | |
|---|---|---|---|---|
| 3,813,496 A | * | 5/1974 | Maillet | 370/324 |
| 5,513,183 A | * | 4/1996 | Kay et al. | 370/337 |
| 6,363,055 B1 | | 3/2002 | Sasson | |
| 6,489,803 B1 | | 12/2002 | Steiner et al. | |
| 7,318,185 B2 | | 1/2008 | Khandani et al. | |
| 2003/0185167 A1 | * | 10/2003 | Paneth et al. | 370/321 |
| 2005/0124334 A1 | * | 6/2005 | Rajkotia | 455/422.1 |
| 2006/0013188 A1 | * | 1/2006 | Wiatrowski et al. | 370/347 |
| 2007/0207750 A1 | * | 9/2007 | Brown et al. | 455/127.5 |
| 2010/0098051 A1 | * | 4/2010 | Uemura | 370/350 |
| 2011/0032429 A1 | * | 2/2011 | Bing | 348/608 |
| 2011/0267939 A1 | | 11/2011 | Streed et al. | |
| 2012/0106536 A1 | | 5/2012 | Natarahjan et al. | |

FOREIGN PATENT DOCUMENTS

DE 19818514 A1 11/1999

OTHER PUBLICATIONS

International Search Report and Written Opinion International Patent Application No. PCT/US20011059934 issued on Aug. 17, 2012.
Non Final Office Action mailed Dec. 7, 2012 in related U.S. Appl. No. 12/771,139, James E. Streed, filed Apr. 30, 2010.

* cited by examiner

*Primary Examiner* — Chi Pham
*Assistant Examiner* — Raul Rivas

(57) ABSTRACT

Methods and apparatus are provided for radio link maintenance at a mobile radio in a wireless communication network. The disclosed methods and apparatus help a mobile radio maintain a radio link by regularly monitoring frame synchronization, regularly checking a scrambling sequence of a mobile radio against that of infrastructure equipment, and regularly detecting and/or recovering from fade conditions. In the event the radio link can not be maintained, then the disclosed methods and apparatus will cause the mobile radio to switch to a control channel so that the synchronization, scrambling mismatch and/or fade issues may be corrected. In one implementation, the disclosed methods and apparatus can be implemented at mobile radios in an Association of Public-Safety Communications Officials (APCO) Project 25 (P25) compliant system.

20 Claims, 9 Drawing Sheets

US 8,437,334 B2

METHODS AND APPARATUS FOR METHOD FOR MAINTAINING A RADIO LINK AT A MOBILE RADIO

FIELD OF THE DISCLOSURE

The present disclosure relates generally to wireless communication, and more particularly, to methods and apparatus for radio link maintenance in a wireless communication system.

BACKGROUND

As public safety agencies and other organizations evaluate their two-way radio needs for the future, a number of possible solutions are available, including various digital radio technologies.

For instance, the Association of Public-Safety Communications Officials (APCO) Project 25 (P25) (or APCO-25) represents one effort to set standards for digital two-way radio technology. In general, P25 refers to a suite of narrowband digital Land Mobile Radio (LMR) communication standards for digital radio communications, equipment and systems. P25 standards are produced through the joint efforts of the Association of Public Safety Communications Officials International (APCO), the National Association of State Technology Directors (NASTD), selected Federal Agencies and the National Communications System (NCS), and standardized under the Telecommunications Industry Association (TIA). Further details regarding the P25 standards can be obtained from the Telecommunications Industry Association, 2500 Wilson Boulevard, Suite 300 Arlington, Va. 22201.

P25 standards specify a Common Air Interface (CAI) that defines the type and content of signals transmitted by P25-compliant radios. P25-compliant radios can communicate directly with each other in "talk around" mode without any intervening equipment between two radios, or in conventional mode where a requesting radio chooses the channel to talk on and two radios communicate through a repeater or base station without trunking. In addition, two radios may communicate in a trunked mode where infrastructure equipment dynamically assigns the requesting radio a channel to talk on and traffic is automatically assigned to one or more voice channels on a repeater or base station.

P25-compliant technology is being deployed in several phases commonly referred to as Phase 1 and Phase 2. Phase 2 is currently under development to improve spectrum utilization. Among other changes to the Phase 1 standard, the Phase 2 standard proposes significant changes to the CAI. One of the major changes is the migration from a Frequency Division Multiple Access (FDMA)-based channel access scheme to a Time Division Multiple Access (TDMA)-based channel access scheme. As such, synchronization between the mobile radio and the base station is of high importance, and therefore methods for detecting synchronization problems are needed. In addition, in the Project 25 Phase 2 standard, the air interface payload is scrambled, and therefore methods for detecting scrambling problems are needed.

In any wireless communication system, radio signals are subject to wide power level variations over time due to shadowing, fading, change in distance between a mobile radio and a base station, and the like, and thus exhibit signal quality variations with respect to the communication links used for communicating between them. As used herein, any condition where the radio signal strength weakens to the point where radio communications are affected can be referred to as "fading." Fading can be due to short term variations in radio signals (e.g., Raleigh fading), or due to an increase in distance between the transmitting radio and the receiving radio.

As such, it is important to provide a mechanism for infrastructure equipment to determine when a call (or communication session) has ended so that communication resources assigned to that call can used by other mobile stations. From the perspective of the mobile radio, radio interfaces are challenging to establish and maintain. When a trunked radio voice connection is interrupted, the mobile radio needs to decide if the call is still viable. Phase 2 trunked voice radio connections can be compromised in a number of ways, including improper synchronization, incorrect scrambling, and signal interruptions. The signal interruptions can interfere with the mobile radio's synchronization and data extraction. Therefore, it is also important to provide a mechanism for mobile radios to determine when fading conditions are occurring, and to provide mechanisms for dealing with such fading conditions.

In some wireless communication systems, when a mobile radio completes a transmission it can transmit an explicit termination instruction (sometimes called an end-of-call message) to infrastructure equipment. In response the infrastructure equipment terminates the call, and the communication channel and other resources may then be made available for other calls. In some cases a mobile station does not intend to end its call, but moves out of range of the base station that it is communicating with. Because the mobile station does not intend to end the call, an end-of-call message is not transmitted, and hence the infrastructure equipment (e.g., base station) does not receive an explicit end-of-call message from that mobile radio. In other cases, the mobile station might transmit an end-of-call indication, but it may not be received by the infrastructure equipment or might, for example, contain too many errors to be decoded correctly.

When a base station completes a voice transmission in a trunked system by sending an end-of-call message, the mobile radio switches to the control channel to be available for other calls.

However, when fade conditions occur (e.g., when a drop in the radio frequency (RF) power level truncates the end of the call), the mobile radio should nevertheless be able to detect and confirm that the call has ended. The mobile radio needs a mechanism to switch to the control channel without receiving an explicit instruction from the base station.

At the same time, because fading happens regularly in a wireless environment, it is desirable for the mobile radio not to prematurely drop a call just because a temporary fade condition has been detected. In the event a call is prematurely dropped due to fading and the mobile station is still within the coverage area of the base station, the mobile radio should also be able to resume the call as soon as possible. The mechanism employed by the mobile radio to switch to the control channel (without explicit instruction from the base station) not only has to be reliable, but it also has to be relatively insensitive to fringe RF conditions. An operational goal is to minimize the probability that a viable call on the fringe of coverage is terminated while still truncating non-viable calls reasonably quickly to reduce the probability of missing subsequent calls.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
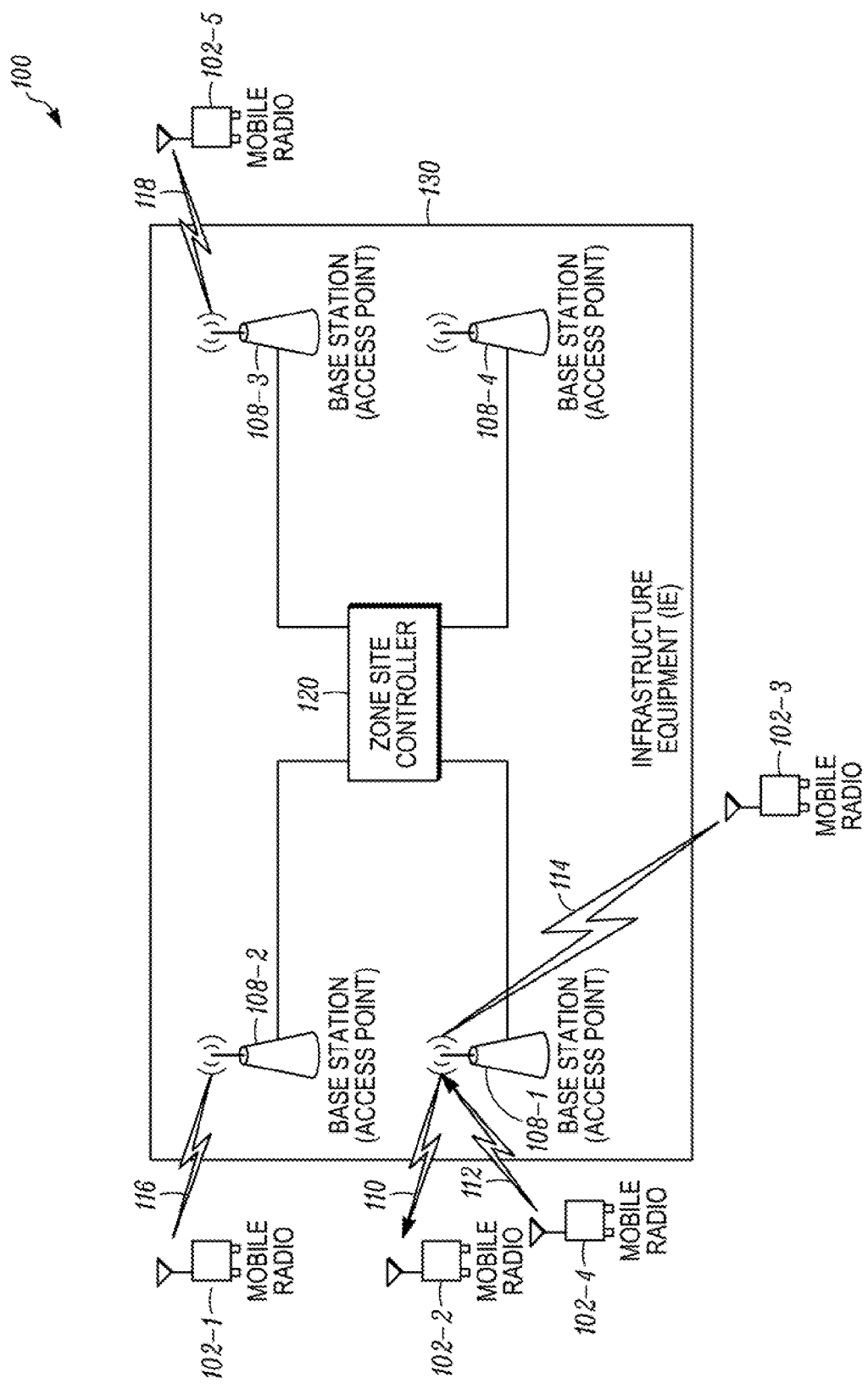
FIG. 1 illustrates a wireless communication system in which various embodiments can be implemented.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Methods and apparatus are provided for radio link maintenance at a mobile radio in a wireless communication network. The disclosed methods and apparatus help a mobile radio maintain a radio link by regularly monitoring frame synchronization, regularly checking a scrambling sequence of a mobile radio against that of infrastructure equipment, and regularly detecting and/or recovering from fade condition. As used herein, the term "regularly" means in a regular manner or on a regular basis or at normal intervals, and in some implementations can mean at regularly occurring or periodic intervals, but is not strictly limited to occurring to occurring on a periodic basis. In the event the radio link can not be maintained, then the disclosed methods and apparatus will cause the mobile radio to switch to or switch back to a control channel so that the synchronization, scrambling mismatch and/or fade issues may be corrected.

In accordance with some of the disclosed embodiments, a mobile radio receives transmissions from infrastructure equipment in time slots over an outbound traffic channel. In some implementations, the mobile radio is configured to receive bursts in time slots transmitted from the infrastructure equipment over an outbound traffic channel. A logical Inter-slot Signaling Channel (ISCH) can be implemented between bursts. The logical ISCH includes a Synchronization Inter-slot Signaling Channel (S-ISCH) that includes synchronization data having a known synchronization pattern, and an Information Inter-slot Signaling Channel (I-ISCH) that indicates a voice channel number of a subsequent burst, a location of the logical ISCH in a superframe and a location of a current superframe within an ultraframe. The mobile radio can determine, based on the logical I-ISCH, whether the mobile radio is synchronized with the infrastructure equipment.

In accordance with some of the disclosed embodiments, the mobile radio starts a synchronization acquisition timer upon arriving on the outbound traffic channel. The synchronization acquisition timer specifies an amount of time that the mobile radio is permitted to acquire synchronization with the traffic channel of the base station. The synchronization acquisition timer continues to run until the synchronization acquisition timer expires or until the synchronization acquisition timer is stopped and reset.

The mobile radio can regularly determine whether a known synchronization pattern of a logical ISCH is detected that is consistent with ultraframe synchronization to verify ultraframe synchronization. When the mobile radio detects a known synchronization pattern that is consistent with ultraframe synchronization, the mobile radio stops and resets the synchronization acquisition timer. The known synchronization pattern can be any pattern that is known to the mobile radio and in one implementation is based on ISCH patterns known to the mobile radio.

In some embodiments, the mobile radio can maintain a frame synchronization register that stores a first number of incorrect frame synchronization entries detected in a last number of frame synchronization opportunities. Incorrect frame synchronization refers to frame synchronization information that is inconsistent with a predicted frame synchronization information. Each frame synchronization entry is either an incorrect frame synchronization result or a correct frame synchronization result. The mobile radio removes an oldest frame synchronization result from the frame synchronization register each time the mobile radio receives a time slot from the infrastructure equipment that has the logical I-ISCH. In addition, the mobile radio also predicts a predicted voice channel number, a predicted ultraframe count and a predicted I-ISCH location of that particular time slot in a superframe, and also detects a detected voice channel number, a detected ultraframe count and a detected I-ISCH location of that particular time slot in a superframe. The mobile radio can then determine whether the detected voice channel number, the detected ultraframe count and the detected I-ISCH location in the superframe are consistent with predicted voice channel number, the predicted ultraframe count and the predicted I-ISCH location in the superframe. The mobile radio can then add a newest frame synchronization result as a first entry in the frame synchronization register. The newest frame synchronization result can be either a correct frame synchronization entry when the mobile radio determines that the detected and predicted information match, or can be an incorrect frame synchronization entry when there is no match.

The mobile radio also continues to monitor ultraframe synchronization with the outbound traffic channel by determining whether a number of incorrect frame synchronization entries presently stored in a frame synchronization register is greater than or equal to a first threshold. The mobile radio can determine whether the first number of incorrect frame synchronization entries presently stored in the frame synchronization register is greater than or equal to a first threshold. When the first number of incorrect frame synchronization entries presently stored in the frame synchronization register is determined to be greater than or equal to the first threshold, the mobile radio can restart the synchronization acquisition timer and re-verify ultraframe synchronization by determining whether a known synchronization pattern of the logical ISCH is detected that is consistent with ultraframe synchronization. By contrast, when the first number of incorrect frame synchronization entries presently stored in the frame synchronization register is determined to be less than the first threshold, the mobile radio can continue to determine, based on a next logical I-ISCH, whether the mobile radio remains synchronized to the infrastructure equipment over the outbound traffic channel.

When the mobile radio is unable to acquire or re-acquire (in the event it was acquired previously but then subsequently the number of incorrect frame synchronization entries stored in a frame synchronization register is greater than or equal to a first threshold) ultraframe synchronization before the synchronization acquisition timer expires, the mobile radio may switch to a control channel to attempt to become synchronized with ultraframe timing.

In some embodiments, the mobile radio is configured to receive Slow Access Control Channel (SACCH) bursts and/or and Fast Access Control Channel (FACCH) bursts in some of the time slots transmitted from the infrastructure equipment over an outbound traffic channel. The mobile radio can count a first number of scrambled SACCH burst decoding opportunities, decode the scrambled SACCH bursts, count a second number of the scrambled SACCH bursts that were successfully decoded, and when the mobile radio determines that decoding of a current scrambled SACCH burst was unsuccessful, and that the first number of scrambled SACCH burst decoding opportunities is greater than or equal to a second threshold can switch to the control channel to correct a scrambling sequence mismatch between a scrambling sequence of the mobile radio and another scrambling sequence of the infrastructure equipment. For instance, in one implementation, the mobile radio can switch to the control channel when the mobile radio determines that the second number of the scrambled SACCH bursts that were successfully decoded is less than a third threshold, and that a first number of scrambled SACCH burst decoding opportunities is greater than or equal to the second threshold.

In other embodiments, the mobile radio can also implement a fade timer that can be used during fade protection. The fade timer can be started when a fade condition is detected to being timing the duration of the fade condition. The mobile radio continuously determines whether the fade timer has expired, and if/when the fade timer does expire, the mobile radio can switch to the control channel. The mobile radio can stop and reset the fade timer when the mobile radio successfully decodes a SACCH burst or a FACCH burst.

The mobile radio can maintain a synchronization register that stores a number of synchronization pattern detection entries that have occurred in a last number of synchronization pattern detection opportunities. A synchronization pattern detection opportunity occurs when the mobile radio attempts to detect a known synchronization pattern in a time slot that includes the logical ISCH. Each synchronization pattern detection entry is either a missed synchronization pattern detection entry (e.g., when the mobile radio is unable to detect a known synchronization pattern in a time slot that includes the logical ISCH, or a successful synchronization pattern detection entry when the mobile radio is able to detect a known synchronization pattern in a time slot that includes the logical ISCH. The synchronization register includes a number of missed synchronization pattern detection entries that have occurred in a last number of synchronization detection opportunities. Whenever a SACCH burst or a FACCH burst is successfully decoded, all of the missed synchronization pattern detection entries that are presently stored in the synchronization register can be cleared.

Each time a time slot that includes the logical ISCH is received, the mobile radio can remove the last synchronization pattern detection entry from the synchronization register, and search for a known synchronization pattern in a time slot that includes the logical ISCH. When the mobile radio is able to detect a known synchronization pattern in a time slot that includes the logical ISCH, it adds a successful synchronization pattern detection entry to the synchronization register. When the mobile radio is unable to detect a known synchronization pattern in a time slot that includes the logical ISCH, it adds a missed synchronization pattern detection entry to the synchronization register. In this manner, the synchronization register includes a number of missed synchronization pattern detection entries that have occurred in a last number of synchronization detection opportunities.

The mobile radio can then determine whether the number of missed synchronization pattern detection entries that is presently stored in the synchronization register is greater than or equal to a fourth threshold, and if so, can start the fade timer to indicate detection of a fade condition.

According to some embodiments, methods described above can be used in wireless communication systems, such as Project 25, Phase 2 compliant communication systems, and can be implemented at a mobile radio to maintain a radio link, to monitor frame synchronization, to check scrambling sequences, and to detect and/or recover from a fade condition. As will be described below, these radio link maintenance methods balance two conflicting performance requirements of speed and reliability.

FIG. 1 illustrates a wireless communication system 100 in which various embodiments can be implemented. The wireless communication system 100 comprises a plurality of communications devices such as the illustrated mobile radios 102-1 through 102-5, which may be, for example, a portable radio, a personal digital assistant, a cellular telephone, a video terminal, a portable computer with a wireless modem, or any other wireless communication device. For purposes of the following discussions, the communication devices will be referred to as "mobile radios," but they are also referred to in the art as subscriber units, mobile stations, mobile equipment, handsets, mobile subscribers, or an equivalent.

As illustrated, for example, the mobile radios 102-1 through 102-5 communicate over wireless communication links 110, 112, 114, 116, 118 with infrastructure equipment (IE) 130 that can be part of an access network. The IE 130 may also be referred to as Fixed Network Equipment (FNE). Those of ordinary skill in the art will appreciate that any type of wireless communication network is within the scope of the teachings herein. Thus, the IE 130 can comprise infrastructure such as, but not limited to, base stations (BS) (with four BSs 108-1 . . . 108-4 shown for clarity) that operate under control of a call controller 120 that controls trunking resources, sometimes referred to as a zone or site controller. The IE 130 can also include other elements such as switches, BS controllers (not shown), network elements (such as, a mobile switching center, home location register, visitor location register, a console operator position, etc.), and the like, to facilitate the communications between mobile radios 102-1 through 102-5 having access to the IE 130. It will be appreciated by those of ordinary skill in the art that the IE 130 and mobile radios 102-1 through 102-5 can be part of a wide area network (WAN) that is distributed over a wide area that spans multiple access networks.

For example, in some implementations, the mobile radios 102-1 through 102-5 can communicate with each other through BSs 108. As is known by one of ordinary skill in the art, BS 108 generally comprises one or more repeater devices that can receive a signal from a transmitting mobile radio over one wireless link and re-transmit to listening mobile radios over different wireless links. For example, mobile radio 102-2 can transmit over link 110 to BS 108-1 and BS 108-1 can re-transmit the signal to listening mobile radios 102-3 and 102-4 over wireless links 114 and 112, respectively. BS 108 can also receive a signal from mobile radio 102-3 over wireless link 114 and re-transmit the signal to mobile radios 102-2 and 102-4 over wireless links 110 and 112, respectively. Alternately, BS 108 can receive a signal from mobile radio 102-4 over wireless link 112 and re-transmit the signal to mobile radios 102-2 and 102-3 over wireless links 110 and 114, respectively. In addition, mobile radio 102-5 may communicate with the other mobile radios in other "zones." For ease of illustration, only five mobile radios and four BSs are shown. However, those skilled in the art will appreciate that a typical system can include any number of mobile radios, any number of Base Stations, any number of Base Controllers, and any number of other network elements. Moreover, although in this embodiment communication between mobile radios 102-1 through 102-5 are illustrated as being facilitated by BS 108, mobile radios 102-1 through 102-5 can communicate directly with each other using a direct mode of operation without BSs when they are in communication range of each other.

Figure 2:
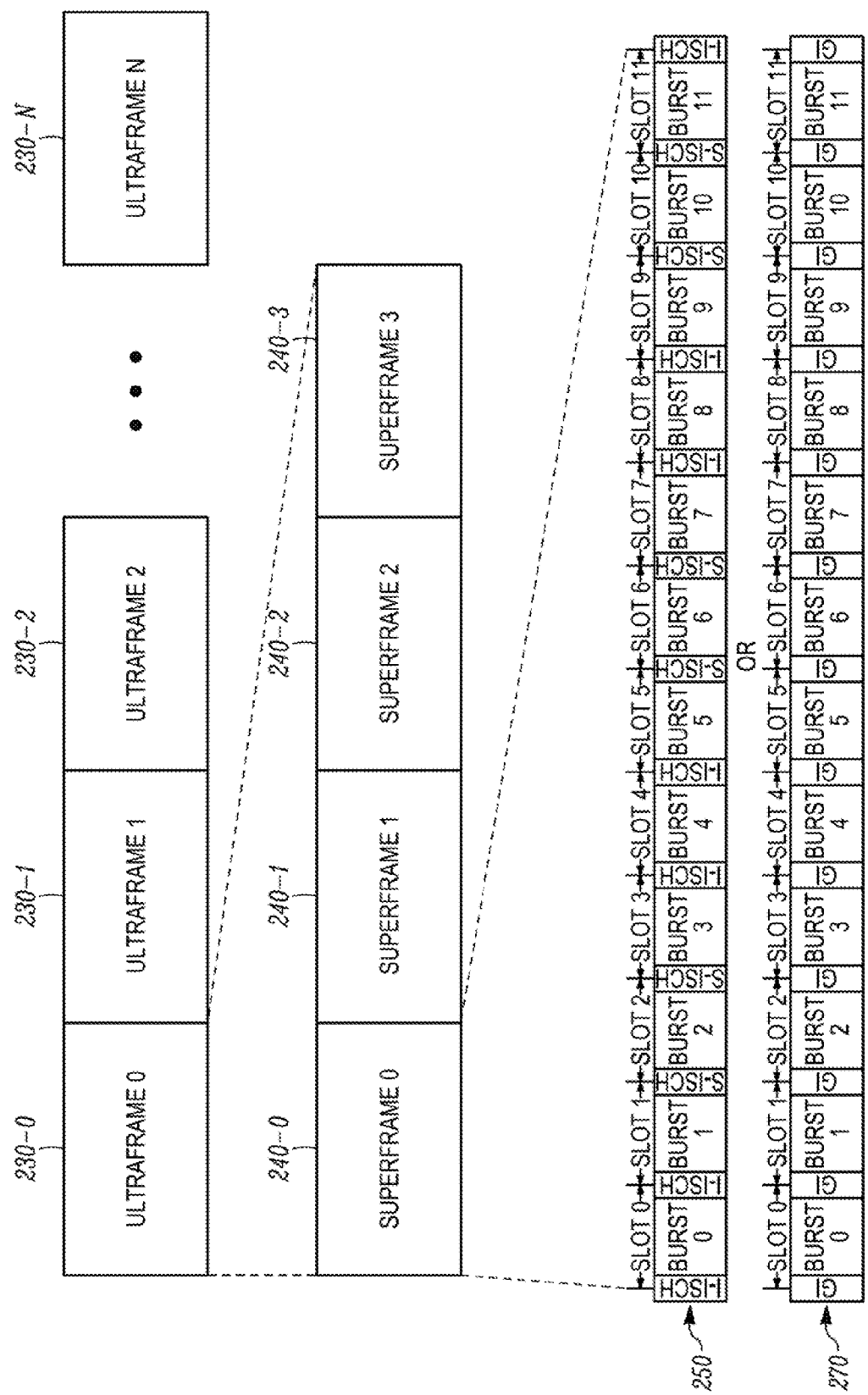
FIG. 2 is a data structure diagram that illustrates a traffic channel structure in a Project 25, Phase 2 compliant system.

Since network 100 is a wireless network, meaning that it supports a wireless or air interface protocol for signal transmission, the mobile radios 102-1 through 102-5, and BS 108, comprise transceivers that include a transmitter and a receiver for transmitting and receiving radio frequency (RF) signals, respectively, as illustrated in FIG. 2. In this regard, both the mobile radios 102-1 through 102-5, and the BSs 108, further comprise one or more processing devices (such as microprocessors, digital signal processors, customized processors, field programmable gate arrays (FPGAs), unique stored program instructions (including both software and firmware), state machines, and the like.) and memory elements for performing (among other functionality) the air interface protocol and channel access scheme supported by network 100. As will be described below, using these protocols, mobile radios 102-1 through 102-5 can each generate RF signals that include bursts of information comprising a plurality of fields for organizing the continuous bits of information and/or signaling for transmission to another mobile radio.

While one embodiment of a communication system 100 is described with regards to FIG. 1, those skilled in the art will appreciate that the specifics of this illustrative example are not specifics of the disclosure itself and that the teachings set forth herein are applicable in a variety of alternative settings. For example, since the teachings described do not depend on the type of air interface protocol or channel access scheme used (e.g., Time Division Multiple Access (TDMA), Code Division Multiple Access (CDMA), Frequency Division Multiple Access (FDMA), and the like), the teachings can be applied to any type of air interface protocol and channel access scheme. The teachings herein can also be applied with any system and with any protocol utilizing wired links. As such, other alternative implementations using different types of wired or wireless protocols and channel access schemes are contemplated and are within the scope of the various teachings described.

Voice Call Phases

A two-way radio channel can be in an idle state or an active state. The channel is in the idle state when the channel is not assigned to a call. The channel is in the active state when the channel is assigned to a call.

During the active state a voice call on an active two-way radio channel may move through a number of phases that can be referred to as a setup phase, a speech phase, a suspended phase, a hangtime phase and a termination phase.

In the setup phase, channel access is requested and granted, and all call participants are summoned to the channel via the Control Channel (CCH). In some scenarios, mobile radio synchronization may have already been completed on the Control Channel (CCH), and therefore is not necessary. The setup phase may optionally also include mobile radio synchronization to the voice channel.

Voice communication takes place during the speech phase. If the flow of speech is interrupted for an extended period of time during the call, but the call has not completed (e.g., the radio signal fades temporarily), the call is in the suspended phase.

When the transmitting mobile radio completes its transmission, the call is in the hangtime phase. During this phase, other participants in the call may request to talk on the same channel. The hangtime phase ensures continuity in a radio conversation because subsequent requestors do not have to wait for a new channel assignment.

When the conversation has ended, the call is in the termination phase. During the termination phase, the channel resources are released and made available for another call.

P25 Phase 2 Traffic Channel Structure

In some implementations, the mobile radios 102-1 through 102-5 can communicate using a traffic channel such as that described in the P25 standards. More specifically, the P25 Phase 2 Media Access Control (MAC) standard defines a bi-directional channel, which is used to exchange voice and signaling blocks between the IE 130 and one or several mobile radios 102-1 through 102-5.

In particular, the Project 25 Phase 2 common air interface defines a traffic channel (TCH) interface. The traffic channel interface has an inbound (mobile radio to base radio/IE) and an outbound (base radio/IE to mobile radio) interface. The inbound and outbound TCH interfaces share many common structures, but they are not identical. Specifically, the outbound interface contains an additional signaling field known as the logical ISCH, which is replaced in the inbound interface with a guard interval (GI) time allocated at the beginning and end portions of each time slot for a transmitting radio to ramp power up and down and also to allow for transmission propagation delay.

FIG. 2 is a data structure diagram that illustrates a traffic channel structure in a Project 25, Phase 2 compliant system. The traffic channel includes a plurality of ultraframes 230-0 . . . 130-N. Each ultraframe 230 includes four superframes. For instance, ultraframe 230-0 includes superframes 240-0, 240-1, 240-2, 240-3. The structure of each superframe 240 depends on whether it is used for the outbound interface or the inbound interface. Each superframe 240 includes twelve time slots (labeled slot 0 through slot 11 in FIG. 2). A portion of each time slot carries a burst of information, and the remaining beginning and ending portions of each time slot (around each burst) is used to implement a logical ISCH on the outbound channel 250 and a guard interval (GI) on the inbound channel 270. For example, in FIG. 2, the inbound superframe structure 250 includes twelve time slots (time slot 0 . . . time slot 11) along with the logical ISCH that is implemented in each of the time slots via an I-ISCH or an S-ISCH. In other words, the ISCH is sent between bursts, utilizing the end of one time slot and the start of the next time slot. By contrast, the outbound superframe structure 270 includes twelve time slots (time slot 0 . . . time slot 11) along with a guard interval implemented between bursts at the beginning and end of each time slot. Further details of regarding the ultraframe and superframe will now be described below.

The traffic channel is subdivided in time into ultraframes 1440 millisecond (ms) long. An ultraframe is a set of four consecutive 360 millisecond (ms) superframes and therefore covers a 1.44 second time interval. Each superframe is comprised of twelve 30 ms time slots, numbered sequentially from 0 to 11. More specifically, each superframe is a set of 2*6 timeslots of 30 ms each for two-slot TDMA, i.e. 360 ms. The traffic channel is logically subdivided into two voice channels (VCH 0 and VCH 1). The outbound VCH 0 occupies six time slots: 0, 2, 4, 6, 8, and 11. The outbound VCH 1 occupies six time slots: 1, 3, 5, 7, 9, and 10. The inbound VCH 0 occupies six time slots: 1, 3, 5, 7, 9, and 10. The inbound VCH 1 occupies six time slots: 0, 2, 4, 6, 8, and 11.

Each voice channel contains two logical sub-channels for signaling information: the SACCH and the FACCH. The P25 Phase 2 MAC standard defines the FACCH as a signaling channel using slots normally assigned to voice on the voice channel. The FACCH is normally used for call establishment or setup, hangtime, and call termination or "teardown" signaling. Further, the P25 Phase 2 MAC standard defines the SACCH as a periodic bi-directional logical channel on the VCH, which is used to exchange signaling or data information between the Fixed Network Equipment (FNE) and one or several mobile radios (MRs) assigned to the corresponding voice logical channel. All signaling is contained in Protocol Data Units (PDUs); some PDUs have the facility to carry a plurality of individual signaling messages.

An Inbound SACCH is used to convey call specific signaling, including information regarding current channel users and current call type, call interrupt requests from listening radios, and call continuation requests during hang time. One SACCH burst per logical voice channel occurs every superframe. An inbound SACCH burst carries a synchronization (SYNC) pattern. The SACCH burst may be scrambled or un-scrambled. Inbound SACCH Signaling includes: random access (RA) SACCH signaling (e.g., listening mobile radio signaling) and non-RA SACCH signaling (e.g., transmitting mobile radio signaling). The inbound SACCH for VCH 0 occupies time slot 10 of every superframe; the inbound SACCH for VCH 1 occupies time slot 11 of every superframe. Conversely, the outbound SACCH for VCH 0 occupies time slot 11 of every superframe; the outbound SACCH for VCH 1 occupies time slot 10 of every superframe.

In the first three superframes of an ultraframe, the transmitting mobile radio transmits signaling information in the SACCH. In the last superframe of an ultraframe, any mobile radio participating in the call may transmit signaling information (e.g., a request to interrupt the call) if the FNE signals that the SACCH is free for a listening radio to use. On the outbound, the last SACCH of a given Voice Channel (e.g., time slot 11 for VCH 0) is used to communicate to the transmitting mobile radio on the same Voice Channel on the inbound. This last SACCH timeslot in an ultraframe is called the Random Access SACCH (RA-SACCH).

The FACCH for outbound VCH 0 occupies time slots 0, 2, 4, 6, and 8 when the call for VCH 0 is in the setup, hangtime, and termination phases; the FACCH for outbound VCH 1 occupies time slots 1, 3, 5, 7, and 9 when the call on VCH 1 is in the setup, hangtime, and termination phases. Conversely, the FACCH for inbound VCH 0 occupies time slots 1, 3, 5, 7, and 9 when the call for VCH 0 is in the setup, hangtime, and termination phases; the FACCH for inbound VCH 1 occupies time slots 0, 2, 4, 6, and 8 when the call on VCH 1 is in the setup, hangtime, and termination phases.

When a call for outbound VCH 0 is in the speech phase, the FACCH is not present, and voice frames are sent in time slots 0, 2, 4, 6, and 8. When a call for VCH 1 is in the speech phase, the FACCH is not present, and voice frames are sent in time slots 1, 3, 5, 7, and 9. Conversely when a call for inbound VCH 0 is in the speech phase, the FACCH is not present, and voice frames are sent in time slots 1, 3, 5, 7, and 9. When a call for VCH 1 is in the speech phase, the FACCH is not present, and voice frames are sent in time slots 0, 2, 4, 6, and 8.

As used herein, the term "burst" refers to a unit of transmission. A burst corresponds to the physical contents of a timeslot. An inbound burst is a continuous succession of modulated bits or symbols that are contained within a timeslot. In an outbound burst, the bits or symbols are modulated continuously and span the entire duration of the transmission across multiple slots and multiple logical channels. In other words, the outbound burst transmission is similar to FDMA where the slotting is purely logical in nature. On the inbound traffic channel, types of burst can include voice bursts and Inbound Encoded MAC Information (IEMI) bursts that include signaling information. These IEMI bursts can occur on either FACCH or SACCH logical sub-channels.

Voice bursts may contain either four voice frames (4V burst) or two voice frames (2V burst). Each superframe can include four 4V bursts, one 2V burst and one burst that includes voice channel signaling (in the SACCH).

Each burst contains a data unit identifier (DUID) which indicates the type of burst. A Data Unit Identifier (DUID) is used to indicate the type of burst communicated in a particular time slot, which can be either a voice burst or IEMI burst. There are two types of voice bursts that are referred to as a 4V burst and a 2V burst. Types of IEMI bursts include a SACCH burst with scrambling, a FACCH burst with scrambling, a SACCH burst without scrambling, or a FACCH burst without scrambling. A DUID is sent in all bursts (slots 0-11). Among other things the DUID can be used distinguish between the scrambled and un-scrambled SACCH and FACCH bursts.

A superframe occupies 360 ms in time, and the superframe carries 360 ms of speech for a voice channel. A superframe contains 18 voice codewords for each voice logical channel within the superframe for a total of 2*18-36 voice codewords per superframe. Each voice codeword contains 20 ms of audio information. A superframe lasts for 360 ms in time, and it contains 360 ms of audio per voice logical channel. Since one of the six time slots of a voice channel superframe is occupied by the SACCH, the remaining five time slots need to carry the 18 voice frames. The voice frames are sent in a 4V-4V-4V-4V-2V pattern. The pattern begins at the start of the speech phase, and the speech phase may start in any non-SACCH time slot on the voice channel. Therefore, the 2V burst is not restricted to a particular time slot in the voice channel. For example, the 2V burst on outbound VCH 0 may be in time slot 0, 2, 4, 6, or 8. Although each superframe contains four 4V bursts and one 2V burst, the time slot of the 2V burst is determined by when the call started, not by the start of the superframe.

Voice bursts also contain encryption synchronization signaling (ESS), used for encrypted communication. The ESS is split into two parts: ESS-A and ESS-B. ESS-A is distributed across the four 4V bursts, and ESS-B is contained in the following 2V burst. A 4V burst contains four 20 ms voice frames (80 ms of user speech) and encryption synchronization signaling (ESS-B); at least some portion of each voice frame is protected with a forward error correction code. In one implementation, voice frames can be partitioned into three groups, one group that is protected with a Golay (24,12), one group protected with a Golay (23,12) and a remaining group that is unprotected. A 2V burst contains two 20 ms voice frames (40 ms of user speech) and encryption synchronization signaling (ESS-A); each voice frame is protected as was described for the 4V burst.

In a Phase 2 TDMA system, whenever a base radio at the IE 130 keys up on an outbound Phase 2 TDMA traffic channel, the IE 130 continuously transmits information on a logical channel called the ISCH, and the mobile radio 102 can use the ISCH to synchronize to the traffic channel (or verify synchronization to the traffic channel).

The ISCH includes an I-ISCH, and an S-ISCH. As illustrated in FIG. 2, each superframe has the following ISCH pattern between each Phase 2 TDMA time slot: (I-ISCH)-(I-ISCH)-(S-ISCH)-(S-ISCH)-(I-ISCH)-(I-ISCH)-(S-ISCH)-(S-ISCH)-(I-ISCH)-(I-ISCH)-(S-ISCH)-(S-ISCH). The ISCH occupies 40 bits between each Phase 2 TDMA burst, where 20 bits are at the end of one time slot and 20 bits are at the beginning of the next time slot. For example, the second half of time slot 0 and the first half time slot 1 make-up a contiguous I-ISCH block. More specifically, the ISCH alternates between two 40 bit segments containing information (I-ISCH), and two 40 bit segments containing synchronization pattern (S-ISCH). The I-ISCH indicates the VCH number of the subsequent burst, location of the ISCH in the superframe and the location of the current superframe within the ultraframe, and therefore allows a mobile radio to determine its current position in the traffic channel. The S-ISCH is used to send synchronization message(s) that include synchronization data that has a known pattern.

Figure 3A:
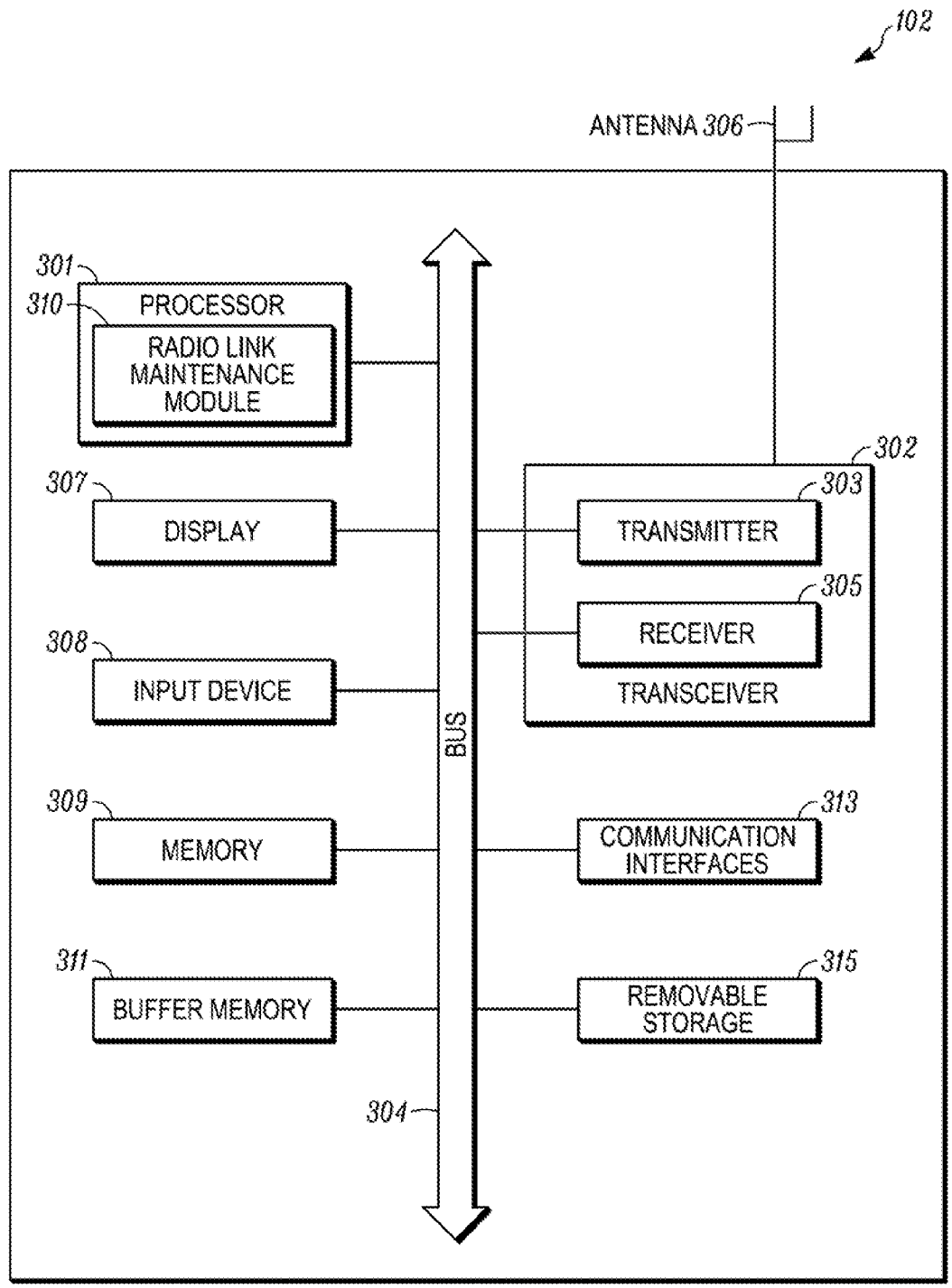
FIG. 3A is a block diagram of mobile radio in accordance with some embodiments.

FIG. 3A is a block diagram of mobile radio 102 in accordance with some embodiments. The mobile radio 102 comprises a processor 301, a transceiver 302 including a transmitter circuitry 303 and a receiver circuitry 305, an antenna 306, a display 307, an input device 308, a memory 309 for storing operating instructions that are executed by the processor 301, a buffer memory 311, one or more communication interfaces 313, and a removable storage unit 315. FIG. 3 also illustrates the various modules that are implemented at the radio link maintenance module 310, as will be described below.

Although not shown, the mobile radio 102 also can include an antenna switch, duplexer, circulator, or other highly isolative means (not shown) for intermittently providing information bursts or packets from the transmitter circuitry 303 to the antenna 306 and from the antenna 306 to the receiver circuitry 305.

The processor 301 can include one or more microprocessors, microcontrollers, DSPs (digital signal processors), state machines, logic circuitry, or any other device or devices that process information based on operational or programming instructions. Such operational or programming instructions can be, for example, stored in the memory 309. As will be described in greater detail below, the processor 301 can include a radio link maintenance module 310 that is used to perform processing associated with radio link maintenance methods that include frame synchronization monitoring, a scrambling sequence check and fade protection methods that will be described below with reference to FIGS. 4-7. These methods can be implemented, for example, at a mobile radio defined in Project 25 systems.

The memory 309 may be an IC (integrated circuit) memory chip containing any form of RAM (random-access memory) or ROM (read-only memory), a floppy disk, a CD-ROM (compact disk read-only memory), a hard disk drive, a DVD (digital video disc), a flash memory card or any other non-transitory storage medium for storing digital information.

One of ordinary skill in the art will recognize that when the processor 301 has one or more of its functions performed by a state machine or logic circuitry, the memory 309 containing the corresponding operational instructions may be embedded within the state machine or logic circuitry. The operations performed by the processor 301 and the rest of the mobile radio 102 will be described below with reference to FIGS. 4-7.

The transmitter circuitry 303 and the receiver circuitry 305 enable the mobile radio 102 to communicate information bursts or packets to and acquire information bursts or packets from the mobile radios and other nodes. In this regard, the transmitter circuitry 303 and the receiver circuitry 305 include conventional circuitry to enable digital or analog transmissions over a wireless communication channel sometimes referred to as a common air interface.

The implementations of the transmitter circuitry 303 and the receiver circuitry 305 depend on the implementation of the mobile radio 102 and can be implemented as part of a hardware and software architecture in accordance with known techniques. Most, if not all, of the functions of the transmitter circuitry 303 and/or the receiver circuitry 305 may be implemented in a processor or processors, such as the processor 301. However, the processor 301, the transmitter circuitry 303, and the receiver circuitry 305 have been artificially partitioned herein to facilitate a better understanding.

The receiver circuitry 305 is capable of receiving radio frequency (RF) signals from at least one and in some cases multiple bandwidths. The receiver circuitry 305 may optionally comprise a first receiver and a second receiver, or one receiver capable of receiving in two or more bandwidths. The transceiver 302 includes at least one set of transmitter circuitry 303. The transmitter circuitry 303 may be capable of transmitting to multiple devices on multiple frequency bands.

The antenna 306 comprises any known or developed structure for radiating and receiving electromagnetic energy in the frequency range containing the wireless carrier frequencies.

The buffer memory 311 may be any form of volatile memory, such as RAM, and is used for temporarily storing received information packets in accordance with the present invention.

Figure 3B:
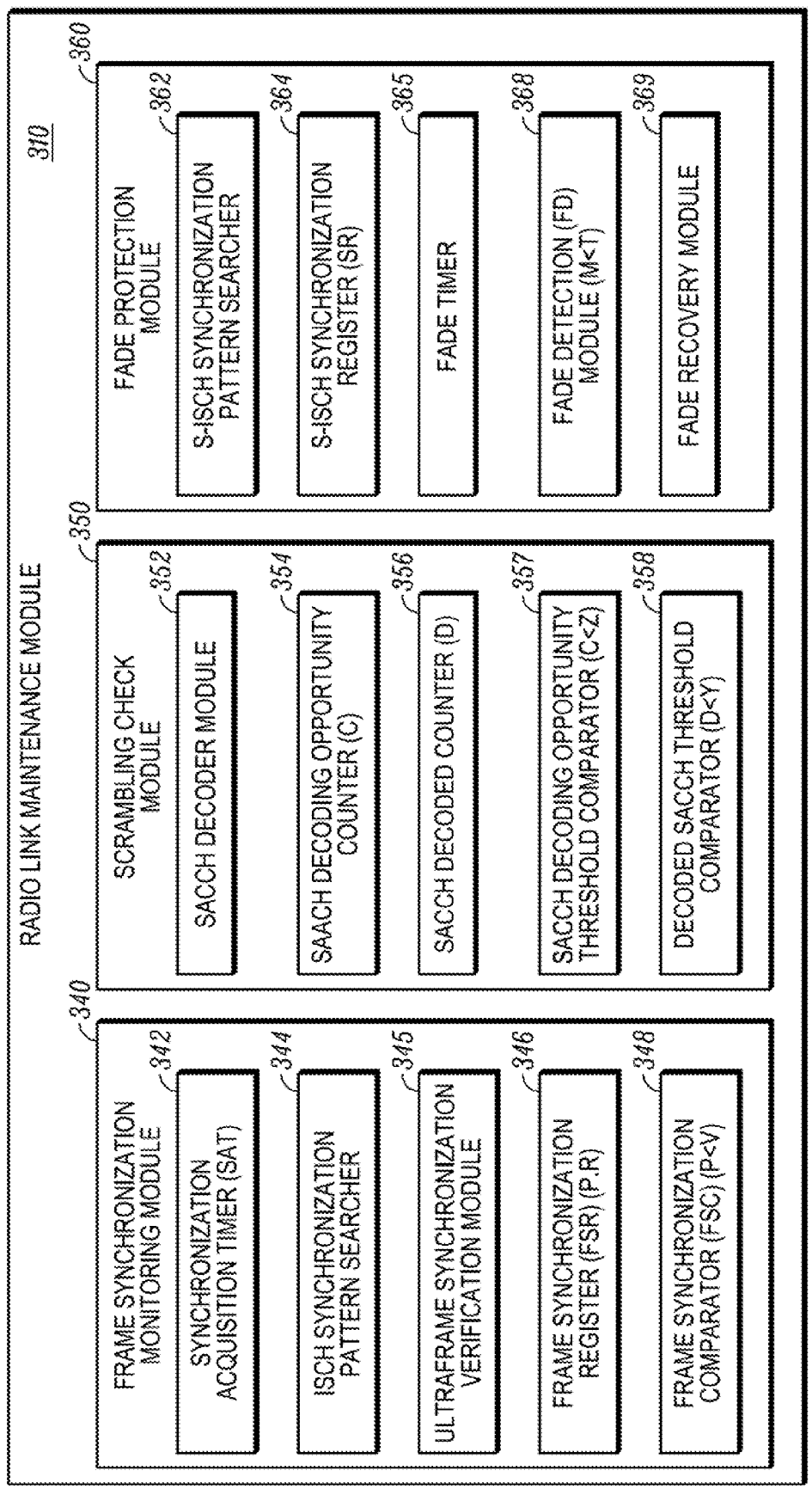
FIG. 3B is a block diagram of a radio link maintenance module operating within the mobile radio of FIG. 3A in accordance with some embodiments.

FIG. 3B is a block diagram of the radio link maintenance module 310 in accordance with some embodiments. The radio link maintenance module 310 includes a frame synchronization monitoring module 340, a scrambling check module 350 and a fade protection module 360. The frame synchronization monitoring module 340 includes a synchronization acquisition timer 342, an ISCH synchronization pattern searcher 344, an ultraframe synchronization verification module 345, a frame synchronization register (FSR) 346 and a frame synchronization comparator (FSC) 348. Operational details of the modules 342, 344, 346, 348 will be described below with reference to FIGS. 5A and 5B. The scrambling check module 350 includes a SACCH decoder module 352, a SACCH decoding opportunity counter 354, a SACCH decoded counter 356, a SACCH decoding opportunity threshold comparator 357 and a decoded SACCH threshold comparator 358. Operational details of the modules 352-258 will be described below with reference to FIG. 6. The fade protection module 360 includes a S-ISCH synchronization pattern searcher 362, a S-ISCH synchronization register 364, a fade timer 365, a fade detection (FD) module 368 and a fade recovery (FR) module 369. Operational details of the modules 362-268 will be described below with reference to FIG. 7.

Figure 4:
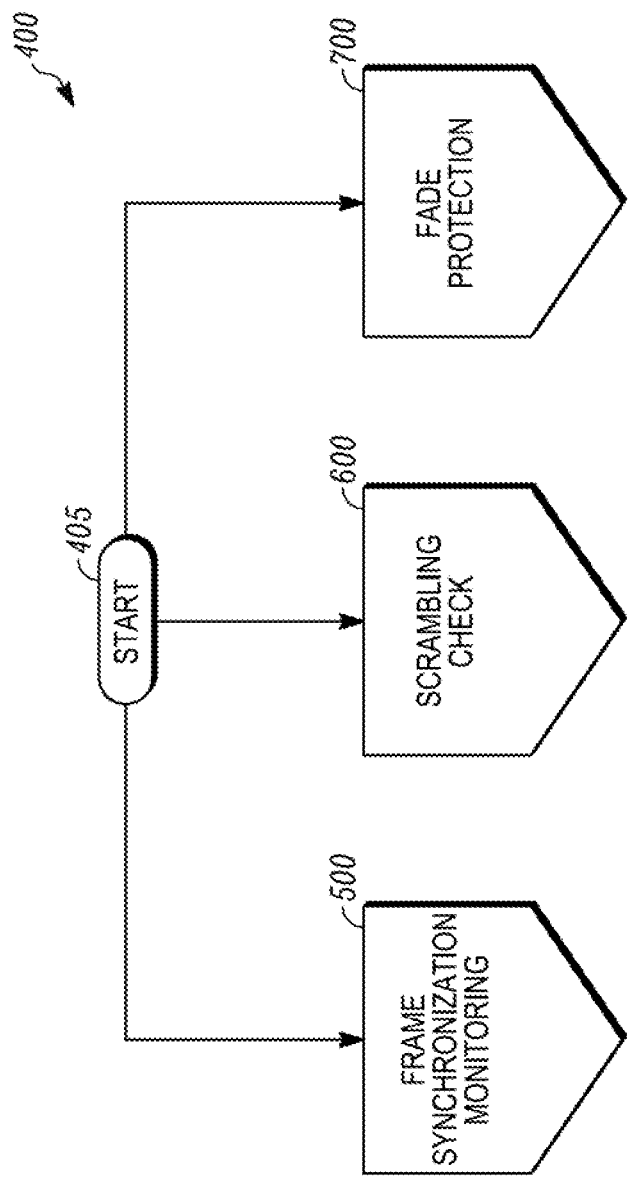
FIG. 4 is a flowchart illustrating a method for maintaining a radio link that can be implemented at a mobile radio in accordance with some embodiments.

FIG. 4 is a flowchart illustrating a method 400 for maintaining a radio link that can be implemented at a mobile radio 102 in accordance with some embodiments.

The 400 begins at event 405 after the mobile radio 102 tunes to the traffic channel (e.g., changes its receiver frequency from monitoring the control channel to monitor the traffic channel) and achieves ultraframe synchronization to the IE. Event 405 triggers three methods (or tasks) 500, 600 and 600 that may run or execute concurrently with each other as part of the method 400 for maintaining a radio link. As will be explained below, the method 400 for maintaining a radio link works during all phases of a voice call including the call setup phase, the speech phase, and the hangtime phase. These three methods (or tasks) 500, 600 and 700 will now be described below with reference to FIGS. 5-7, respectively.

Figure 5A:
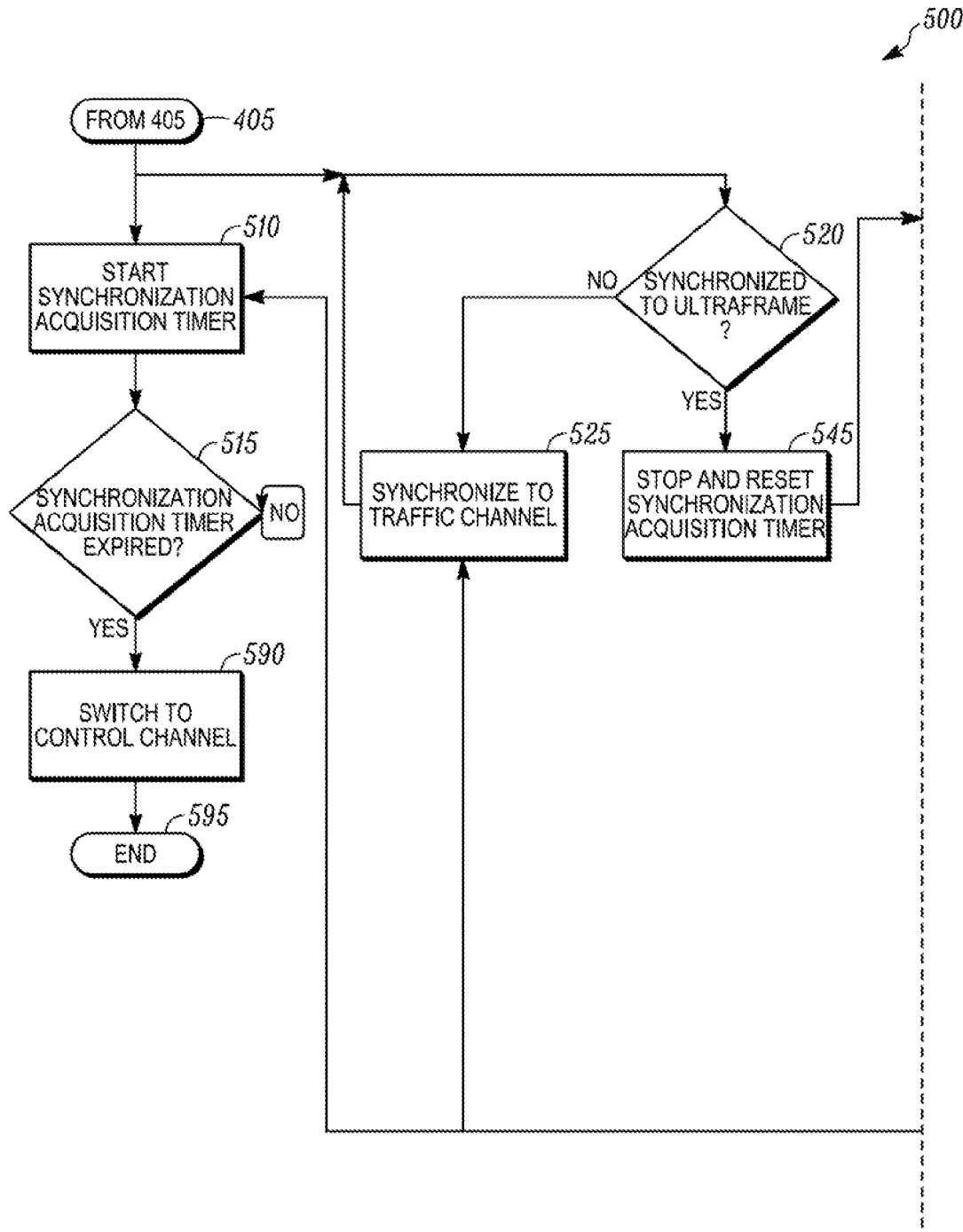
FIGS. 5A and 5B taken together are a flowchart illustrating a method for monitoring frame synchronization during the method for maintaining a radio link of FIG. 4 in accordance with some embodiments.
Figure 5B:
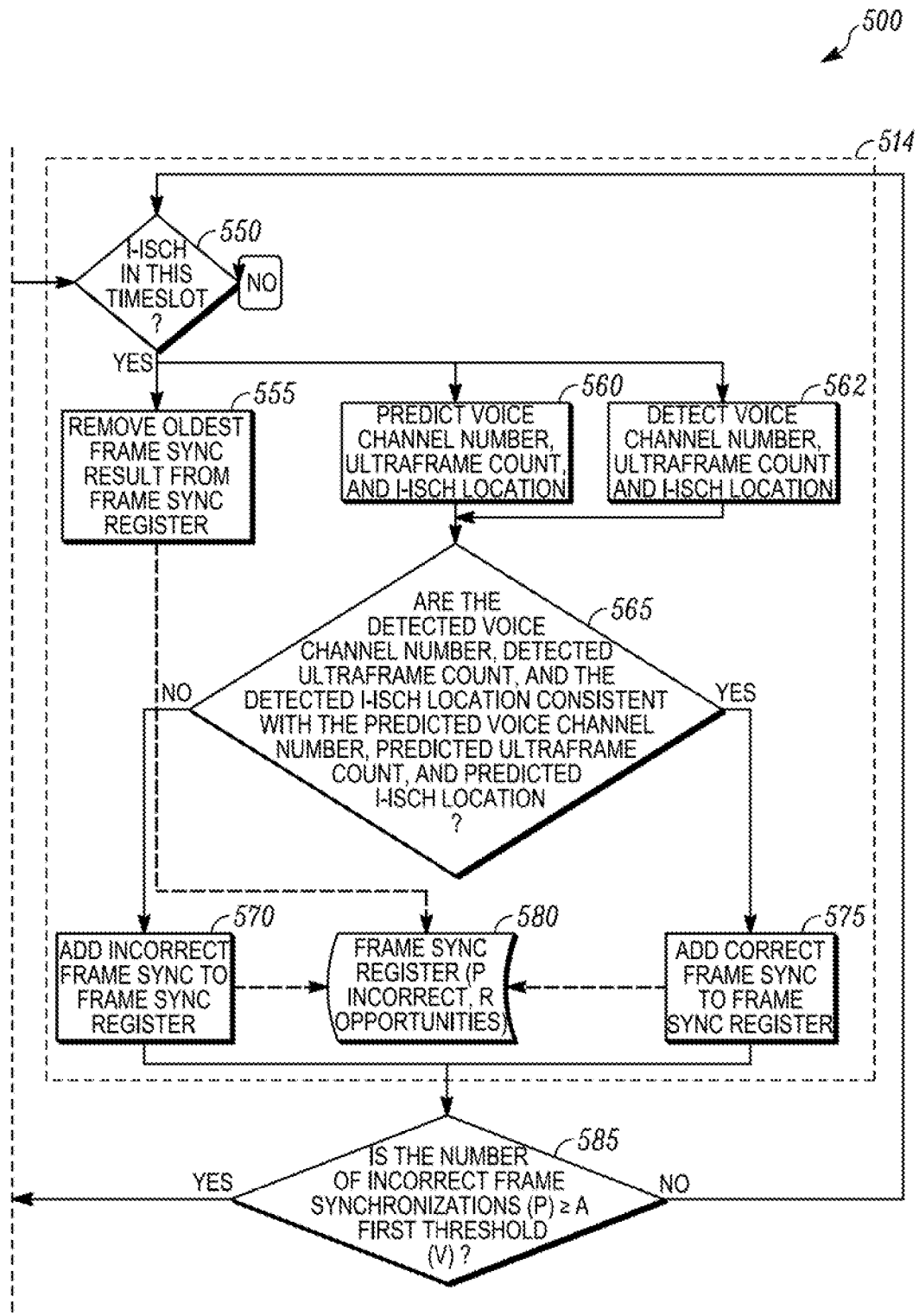

FIGS. 5A and 5B are a flowchart illustrating a method 500 for monitoring frame synchronization 500 during the method 400 for maintaining a radio link of FIG. 4 in accordance with some embodiments.

Whenever the mobile radio 102 tunes to the traffic channel and synchronizes with the IE (at 405), the mobile radio 102 starts a synchronization acquisition timer (SAT) 242 at 510. The SAT 242 specifies an amount of time that the mobile radio 102 is permitted to establish or acquire synchronization with the traffic channel of the base station. The SAT 242 will continue to run until it expires at 515 or is reset. The mobile radio 102 regularly determines (at 515) whether the synchronization acquisition timer (SAT) has expired. When the mobile radio 102 determines that synchronization acquisition timer (SAT) 242 has expired, the method proceeds to 590, where the mobile radio 102 switches to the control channel to attempt to become synchronized with the ultraframe timing, and the method 500 then ends at 595. Thus, if the synchronization acquisition timer expires (at 515) while the mobile radio 102 is attempting to maintain frame synchronization with the IE, the mobile radio 102 switches to the control channel at 590. As will be explained in greater detail below, the synchronization acquisition timer (SAT) 242 can be restarted, for example, when mobile radio 102 determines (at 585) that the number (P) of incorrect frame synchronization entries presently stored in its frame synchronization register (FSR) 246/480 is greater than or equal to a first threshold (V).

Synchronization

When a mobile radio 102 arrives at a traffic channel, the mobile radio 102 may already be synchronized to the traffic channel or may need to perform synchronization operations to attempt to synchronize to the traffic channel. At 520, the ultraframe synchronization verification module 245 of the mobile radio 102 determines whether the mobile radio has become synchronized with the ultraframe timing of the IE (e.g., verifies that a repeating frame synchronization sequence, such as S-ISCH, S-ISCH, I-ISCH, I-ISCH, in the ISCH is consistent with the synchronization). When the ultraframe synchronization verification module 245 of the mobile radio 102 can not verify (at 520) ultraframe timing synchronization with the IE, the mobile radio 102 performs synchronization operations at 525 in an attempt to synchronize with the ultraframe timing of the IE. When the ultraframe synchronization verification module 245 of the mobile radio 102 verifies ultraframe timing synchronization with the IE at 520, the mobile radio 102 stops and resets the synchronization acquisition timer (SAT) 242 (at 545) and the method 500 proceeds to 514, where the mobile radio 102 monitors synchronization with the IE.

Post Synchronization

At 514, the mobile radio 102 performs synchronization monitoring operations and monitors synchronization to the ultraframe and the superframes using the I-ISCH. This synchronization monitoring during the call mitigates any over-the-air issues that might have caused the radio to incorrectly synchronize to the ultraframe boundary.

At 550, the mobile radio 102 determines whether the current time slot includes an I-ISCH. When the mobile radio 102 determines that the current time slot does not include an I-ISCH (at 550), the method 500 continually loops at 550 until a different time slot with an I-ISCH is expected. For example, the I-ISCH Synchronization Pattern Searcher 244 keeps time so it knows when to expect the next I-ISCH. Since the mobile radio is synchronized, it knows when to expect I-ISCHs and follows the "YES" path out of 550 when an I-ISCH is expected. In other words, the mobile radio 102 continues to check the current time slot (at 550) until the mobile radio 102 determines that an I-ISCH is expected, and then the method proceeds to 555, 560 and 562. Although FIG. 5B illustrates blocks 555, 560, 562 in parallel, processing performed at the blocks can be performed in parallel, serially, partly in parallel, partly serially, concurrently, or in any possible arrangement or order.

The mobile radio 102 maintains a frame synchronization register (FSR) 246/480 that stores a number (P) of incorrect frame synchronization entries in the last number (R) of frame synchronization opportunities. Conceptually, the frame synchronization register (FSR) 246/480 can be thought of as a one-column table with R rows that stores frame synchronization entries for the last R frame synchronization opportunities. Each frame synchronization entry can be either an incorrect frame synchronization result or a correct frame synchronization result. A number (P) of incorrect frame synchronization results may be present, and a number (R−P) of correct frame synchronization results may be present.

At 555, the mobile radio 102 removes the oldest frame synchronization result from the frame synchronization register (FSR) 246/480 (as indicated by the dashed line arrow to block 580) so that it can insert a new entry in the frame synchronization register (FSR) 246/480 that will be generated at 570 or 575.

At 560, the mobile radio 102 can also predict what an expected position (e.g., an expected/predicted VCH number, an expected/predicted ultraframe count and an expected/predicted I-ISCH location for the current time slot) on the traffic channel should be based on its initial synchronization to the ultraframe. As mentioned above, the I-ISCH includes framing information that indicates at least (1) the VCH number of the subsequent burst, (2) location of the logical ISCH in the superframe, and (3) the location of the current superframe within the ultraframe. Based on this framing information, the mobile radio can determine its current position in the traffic channel (superframe location and ISCH location within the superframe). The VCH number allows the mobile radio 102 to determine the correct timeslot in that superframe. For example, in one scenario, there can be two consecutive I-ISCHs in time slot 0 and time slot 1 that have an I-ISCH location of 0, and both will have the same ultraframe count. Therefore, the VCH number distinguishes whether the mobile radio received time slot 0 or time slot 1. Thus, at 560, the mobile radio 102 predicts one or more of an expected/predicted VCH number, an expected/predicted ultraframe count and an expected/predicted I-ISCH location for the current time slot. This can be done, for example, by maintaining an internal clock at the mobile radio and using knowledge of the sequence of the traffic channel framing to predict the current position in the ultraframe.

At 562, the mobile radio 102 checks framing information in the I-ISCH of the current time slot to determine a detected voice channel number, a detected ultraframe count and a detected I-ISCH location of the current time slot in the superframe.

The method 500 proceeds to 565 where the mobile radio 102 determines whether the detected VCH number, the detected ultraframe count and the detected I-ISCH location of the current time slot in the superframe (that were detected at 562) are consistent with those predicted at 560 in order determine whether the mobile radio 102 is synchronized in the correct ultraframe and to the correct superframe location within that ultraframe and to the correct time slot in that superframe location.

When the mobile radio 102 determines (at 565) that the detected voice channel number, the detected ultraframe count and the detected I-ISCH location of the current time slot in the superframe (that were detected at 562) are inconsistent with those predicted at 560 (i.e., are inconsistent with frame synchronization), the method 500 proceeds to 570, where the mobile radio 102 adds an incorrect frame synchronization entry to the frame synchronization register (FSR) 246/480. By contrast, when the mobile radio 102 determines (at 565) that the detected voice channel number, the detected ultraframe count and the detected I-ISCH location of the current time slot in the superframe (that were detected at 562) are consistent with those predicted at 560 (i.e., are consistent with frame synchronization), method 500 proceeds to 575, where the mobile radio 102 adds a correct frame synchronization entry to the frame synchronization register (FSR) 246/480.

Following either 570 or 575, the method 500 proceeds to 585, where the frame synchronization comparator 248 of the mobile radio 102 determines whether the number (P) of incorrect frame synchronization entries (in the last number (R) of frame synchronization opportunities) presently stored in the frame synchronization register (FSR) 246/480 is greater than or equal to a first threshold (V). The number (P), the number (R), and the first threshold (V) can be set depending on the implementation to achieve the desired reliability.

When the frame synchronization comparator 248 of the mobile radio 102 determines (at 585) that the number (P) of incorrect frame synchronization entries presently stored in the frame synchronization register (FSR) 246/480 is greater than or equal to the first threshold (V), the method 500 proceeds to 510 and 525. At 510, the mobile radio 102 restarts the synchronization acquisition timer (SAT) 242, and at 525 the ultraframe synchronization pattern searcher 244 of the mobile radio 102 attempts to re-acquire ultraframe synchronization (e.g., searches for a synchronization pattern (e.g., (S-ISCH)-(S-ISCH)-(I-ISCH)-(I-ISCH) pattern) in the ISCH). The method 500 then proceeds to 520, where the mobile radio 102 determines whether it has re-acquired ultraframe synchronization. When the mobile radio 102 determines that it has re-acquired ultraframe synchronization (at 520), the method 500 proceeds to 545, where the mobile radio 102 stops and resets the synchronization acquisition timer (SAT) 242 and the method 500 proceeds to 514, where the mobile radio 102 attempts to maintain synchronization with the IE as described above. When the mobile radio 102 does not reacquire ultraframe synchronization (at 520), the method 500 proceeds to 525, as described above.

When the frame synchronization comparator 248 of the mobile radio 102 determines (at 585) that the number (P) of incorrect frame synchronization entries presently stored in the frame synchronization register (FSR) 246/480 is less than the first threshold (V), the mobile radio 102 presumes it remains synchronized to the ultraframe, and therefore the method 500 loops back to 550 as described above.

Although FIGS. 2B and 5 illustrate embodiments where a frame synchronization monitoring module 240 and where a method 500 for monitoring frame synchronization utilize the I-ISCH to perform synchronization monitoring operations and to monitor synchronization to the ultraframe and the superframes, those skilled in the art will appreciate that in accordance with other embodiments the frame synchronization monitoring module 240 and the method 500 for monitoring frame synchronization could equivalently utilize the S-ISCH to perform synchronization monitoring operations and to monitor synchronization to the ultraframe and the superframes.

Figure 6:
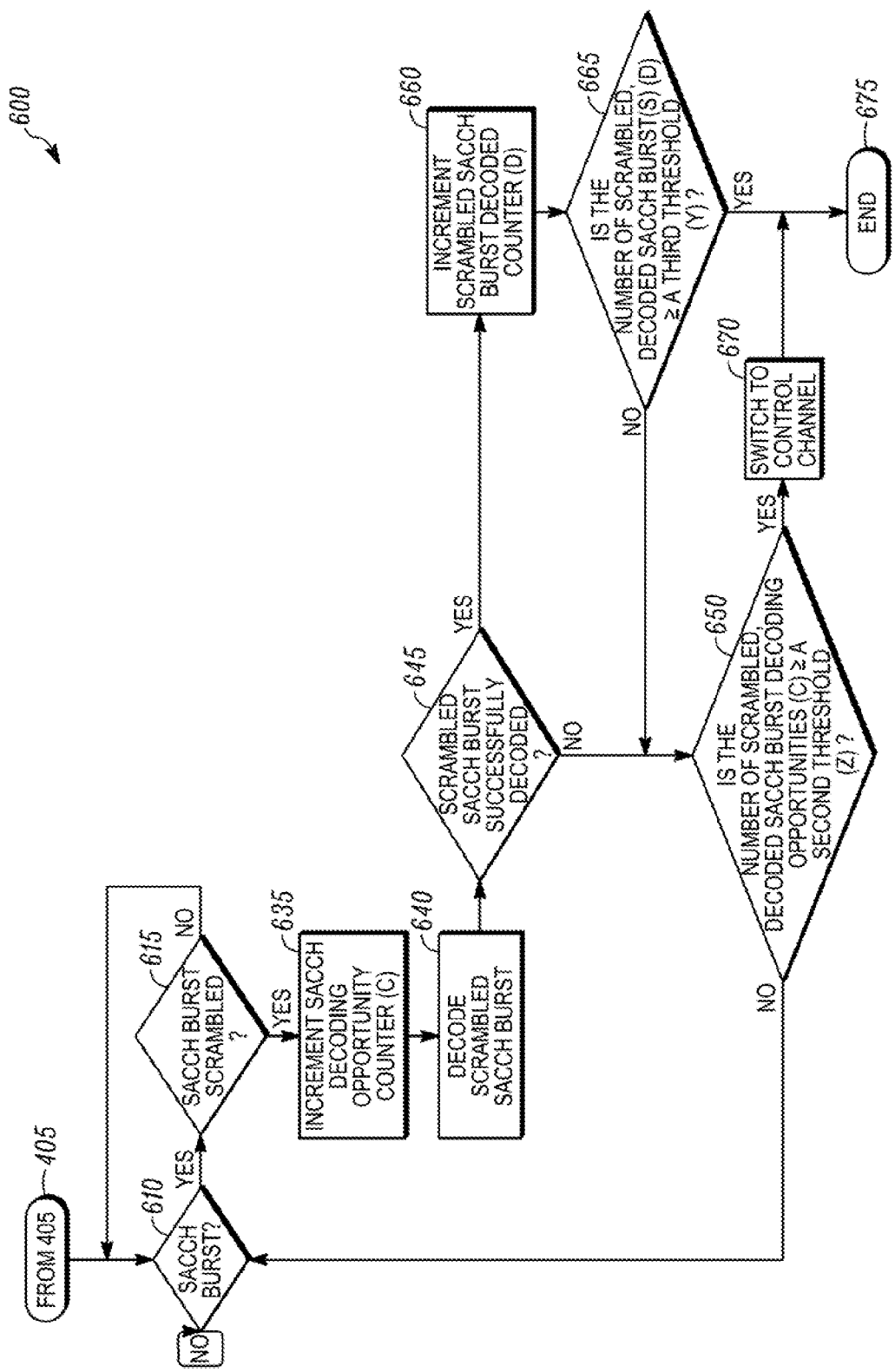
FIG. 6 is a flowchart illustrating a method for performing a scrambling check during the method for maintaining a radio link of FIG. 4 in accordance with some embodiments.

FIG. 6 is a flowchart illustrating a method 600 for performing a scrambling check during the method 400 for maintaining a radio link of FIG. 4 in accordance with some embodiments. Once the mobile radio 102 is synchronized to the ultraframe, the mobile radio 102 knows the location of SACCH bursts, and the SACCH decoder module 252 of the mobile radio 102 attempts to decode and thus validate that the bursts are SACCH bursts at 640/545. In some systems, such as P25 Phase 2 systems, the infrastructure equipment (IE) 130 scrambles at least some (if not all) of its transmissions to the mobile radio 102 before transmitting. A scrambling seed of the infrastructure equipment (IE) determines how the bits on a channel are encoded or randomized in a particular pattern. Ideally, the mobile radio 102 unscrambles the transmissions after receiving them. In accordance with the disclosed embodiments, the scrambling check helps confirm that the scrambling seed of the mobile radio 102 matches the scrambling seed of the infrastructure equipment. Method 600 allows the mobile radio 102 to make sure it is on the correct voice channel that it is supposed to be on, and on the system it is supposed to be on. The scrambling check helps to identify when there is a mismatch in the scrambling sequence between the IE and the mobile radio 102 so the mobile radio 102 can switch to the control channel for a possible scrambling sequence correction.

At 610, the mobile radio 102 checks each incoming burst to determine whether the current burst is a SACCH burst (i.e., timeslot 10 or 11). As described above, the SACCH is a periodic signaling slot occurring once per superframe for each channel (using inverted signaling for two-slot). These slots are not assigned to voice in the VCH. A SACCH burst is sent twice every superframe and thus occurs twice every 360 ms. The superframe pattern lets the mobile radio 102 know that the SACCH bursts are in slots 10 or 11, so slots 10 or 11 can be treated as SACCH bursts. Similarly, the ultraframe pattern lets the mobile radio 102 know when the random access SACCH bursts are. When the mobile radio 102 determines that a current incoming burst is a SACCH burst, the method 600 proceeds to 615.

At 615, the mobile radio 102 inspects the DUID to determine whether information in the SACCH burst is scrambled or not. Most, but not all, SACCH bursts are scrambled.

When the mobile radio 102 determines (at 615) that the SACCH burst is scrambled, the method 600 proceeds to 635. At 635, the SACCH decoding opportunity counter 254 of the mobile radio 102 increments a SACCH Opportunity Counter (SOC) that counts a number (C) of scrambled SACCH decoding opportunities. The method 600 proceeds to 640, where the SACCH decoder module 252 of the mobile radio 102 decodes the scrambled SACCH burst, and the method 600 proceeds to 645. As noted above, because the mobile radio 102 knows the location of the SACCH bursts from its initial ultraframe synchronization, the SACCH decoder module 252 of the mobile radio 102 can attempt to decode SACCH bursts at 640.

At 645, the mobile radio 102 determines whether the scrambled SACCH burst was successfully decoded (e.g., passed a cyclic redundancy check (CRC)).

When the mobile radio 102 determines (at 645) that the scrambled SACCH burst was not successfully decoded, the method 600 proceeds to 650. At 650, the SACCH decoding opportunity threshold comparator 257 of the mobile radio 102 determines whether the number (C) of scrambled SACCH decoding opportunities is greater than or equal to a second threshold (Z). The variables C and Z are chosen to maximize the probability that a failure is due to a scrambling sequence mismatch and not RF impairments.

When the SACCH decoding opportunity threshold comparator 257 of the mobile radio 102 determines (at 650) that the number (C) of scrambled SACCH decoding opportunities is greater than or equal to the second threshold (Z), the method 600 proceeds to 670, where the mobile radio 102 switches to the control channel, and the method 600 then ends at 675. In other words, when the SACCH decoding opportunity threshold comparator 257 of the mobile radio 102 determines (at 650) that it has failed to decode (at 645) at least C scrambled SACCHs in the first Z SACCH decoding opportunities, then the mobile radio 102 switches to the control channel at 670, and the method 600 then ends at 675. In this case, the number of failed decoding opportunities is sufficient to determine that there is a mismatch in the scrambling sequences at the IE and the mobile radio 102. By contrast, when the number (C) of scrambled SACCH decoding opportunities is less than a second threshold (Z), the number (C) of decoding opportunities is not yet sufficient to determine that there is a mismatch between the scrambling sequences at the infrastructure equipment and mobile radio 102.

When the SACCH decoding opportunity threshold comparator 257 of the mobile radio 102 determines (at 650) that the number (C) of SACCH decoding opportunities is less than the second threshold (Z), the method 600 loops back to 610, where the mobile radio 102 waits until it receives the next SACCH burst.

When the mobile radio 102 determines (at 645) that the SACCH burst was successfully decoded, the method 600 proceeds to 660, where the mobile radio 102 increments its SACCH Decoded Counter (SDC) 256 that counts a number (D) of successfully decoded SACCH bursts. The method 600 then proceeds to 665. At 665, the decoded SACCH threshold comparator 258 of the mobile radio 102 determines whether the number (D) of decoded SACCH bursts is greater than or equal to a third threshold (Y). By setting the third threshold (Y) to an appropriate value, the mobile radio 102 can determine whether it has successfully decoded enough SACCHs to assume that it is on the correct channel.

When the decoded SACCH threshold comparator 258 of the mobile radio 102 determines that the number (D) of decoded SACCH bursts is less than the third threshold (Y), the method 600 proceeds to 650, as described above. By contrast, when the decoded SACCH threshold comparator 258 of the mobile radio 102 determines that the number (D) of decoded SACCH bursts is greater than or equal to the third threshold (Y), the scrambling check is successful and the method 600 ends at 675. In other words, when the decoded SACCH threshold comparator 258 of the mobile radio 102 decodes Y scrambled SACCH bursts in at most Z SACCH decoding opportunities (yes at 665), the mobile radio 102 presumes that the scrambling sequences match, and terminates the check at 675.

Figure 7:
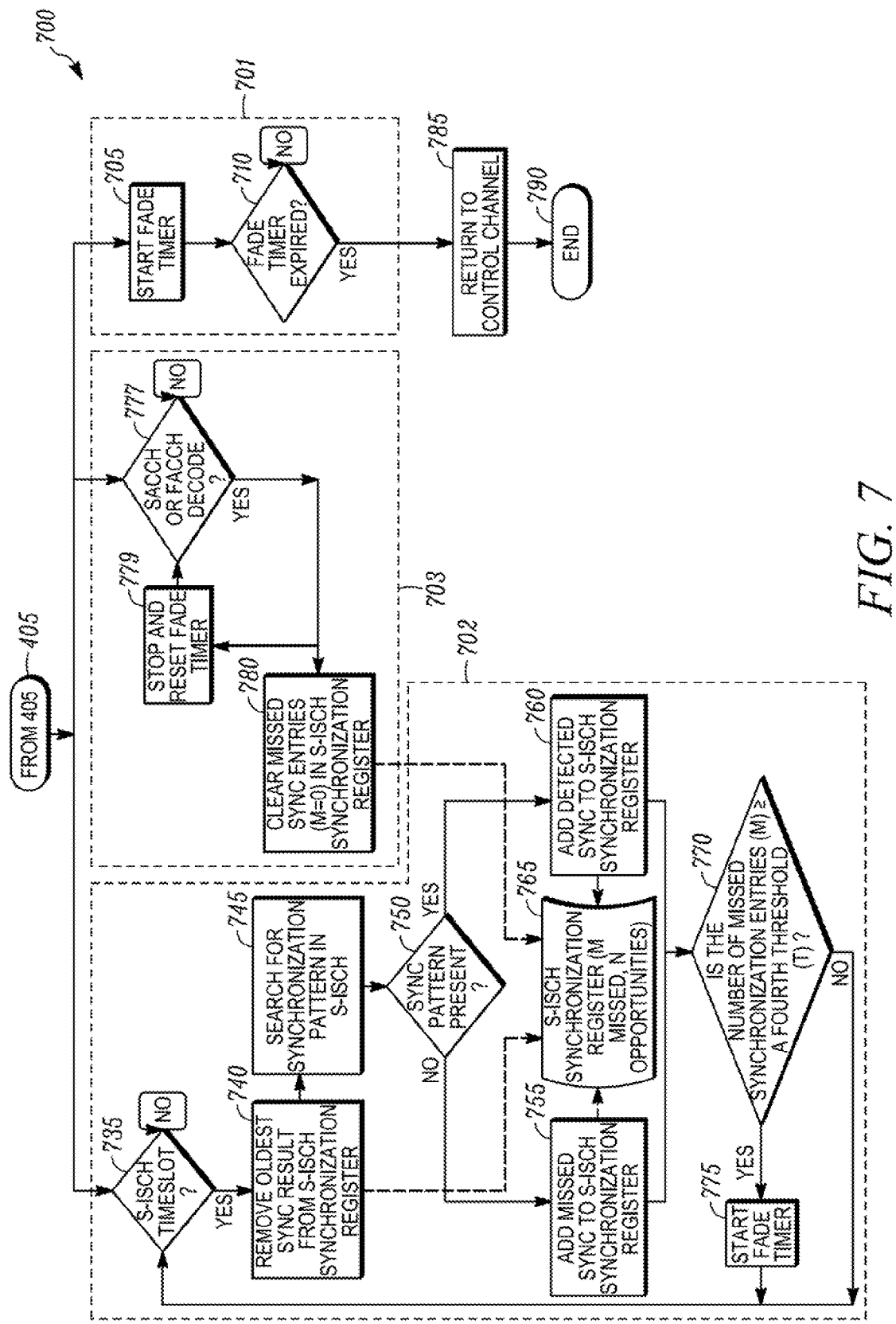
FIG. 7 is a flowchart illustrating a method for ongoing fade protection during the method for maintaining a radio link of FIG. 4 in accordance with some embodiments.

FIG. 7 is a flowchart illustrating a method 700 for ongoing fade protection during the method 400 for maintaining a radio link of FIG. 4 in accordance with some embodiments.

Preliminarily, it is noted that when method 700 begins, three processes 701, 702, 703 marked in dashed-lines can run or execute concurrently. As part of process 701, at 705, the mobile radio 102 starts a fade timer 265 that measures the amount of time that a fade condition has been detected without indicia of recovery from that fade condition.

At 710, the mobile radio 102 continuously monitors the fade timer 265 (at 705) to determine whether the fade timer 265 has expired. When the mobile radio 102 determines that the fade timer 265 has not yet expired (at step 710), the method 700 loops, and the mobile radio 102 continues to monitor the fade timer 265, while it performs fade detection and fade recovery processes 702, 703. When the mobile radio 102 determines that the fade timer 265 has expired (yes at 710) this is indicative of a "non-recoverable" fade condition, and therefore, the method 700 proceeds to step 785, where the mobile radio 102 switches to the control channel. The method 700 then ends at step 790. As will be described below, during process 703 the fade time 265 can be stopped and reset at 779, and during process 702 the fade timer 265 can be restarted at 775.

Fade Detection

At blocks within process 702, the fade detection (FD) module 268 of the mobile radio 102 performs fade detection. Starting at 735, the fade detection (FD) module 268 of the mobile radio 102 continuously checks to determine whether the current time slot is a time slot with an S-ISCH. When the fade detection (FD) module 268 of the mobile radio 102 determines that the current time slot is a time slot with an S-ISCH, the method proceeds to 740, where the fade detection (FD) module 268 of the mobile radio 102 removes the oldest synchronization pattern detection entry from the S-ISCH synchronization register (SR) 264/665 as indicated by the dashed line arrow to block 765.

During the call, the fade detection (FD) module 268 of the mobile radio 102 monitors for radio frequency (RF) fades by searching for the synchronization pattern in each S-ISCH at 745 and 750. At 745, the S-ISCH synchronization pattern searcher 262 of the mobile radio 102 searches for a synchronization pattern in the S-ISCH, and determines whether the synchronization pattern in the S-ISCH is present at 750. In one implementation, the presence or absence of the S-ISCH can be determined at 750 by determining the number of bit errors in the received S-ISCH. If the number of bit errors are greater than or equal to a threshold, the mobile radio 102 can determine that the S-ISCH is absent, and if the number of bit errors is less than the threshold, the mobile radio 102 can determine that the S-ISCH is present. Using the synchronization pattern in the S-ISCH enables a quick fade detection time.

At 765, the mobile radio 102 maintains an S-ISCH synchronization register (SR) 264/665 that stores a number of synchronization pattern detection entries that have occurred in a last number (N) of synchronization pattern detection opportunities. A synchronization pattern detection opportunity occurs when the mobile radio attempts to find a synchronization pattern in a time slot with an S-ISCH. Each synchronization pattern detection entry can be either a missed synchronization pattern detection entry (when the mobile radio 102 is unable to find a synchronization pattern in a time slot with an S-ISCH), or a successful synchronization pattern detection entry (when the mobile radio 102 is able to find a synchronization pattern in a time slot with an S-ISCH). At any given time, the S-ISCH synchronization register (SR) 264/665 can include N-M detected synchronization patterns, where M is a number (M) of missed synchronization pattern detection entries that have occurred in a last number (N) of synchronization detection opportunities.

When the S-ISCH synchronization pattern searcher 262 of the mobile radio 102 determines (at 750) that the synchronization pattern in the S-ISCH is not present, the method 700 proceeds to 755, where the mobile radio 102 adds a missed synchronization pattern detection entry to the S-ISCH synchronization register (SR) 264/665. When the S-ISCH synchronization pattern searcher 262 of the mobile radio 102 determines (at 750) that the synchronization pattern in the S-ISCH is present, method 700 proceeds to 760, where the mobile radio 102 adds a successful synchronization pattern detection entry to the S-ISCH synchronization register (SR) 264/665.

Following either 755 or 760, the method 700 proceeds to 770, where the fade detection (FD) module 268 of the mobile radio 102 determines whether the number (M) of missed synchronization pattern detection entries (in the last number (N) of synchronization pattern detection opportunities) that is presently stored in the S-ISCH synchronization register (SR) 264/665 is greater than or equal to a fourth threshold (T).

When the fade detection (FD) module 268 of the mobile radio 102 determines (at 770) that the number (M) of missed synchronization pattern detection entries (in the last number (N) of synchronization pattern detection opportunities) that is presently stored in the S-ISCH synchronization register (SR) 264/665 is less than the fourth threshold (T), a fade condition has not been detected, and the method 700 loops back to 735.

When the fade detection (FD) module 268 of the mobile radio 102 determines (at 770) that the number (M) of missed synchronization pattern detection entries (in the last number (N) of synchronization pattern detection opportunities) that is presently stored in the S-ISCH synchronization register (SR) 264/665 is greater than or equal to the fourth threshold (T), this indicates that a fade condition has been detected, and the method 700 proceeds to 775, where the fade detection (FD) module 268 of the mobile radio 102 starts the fade timer 265. Thus, if the mobile radio 102 misses T synchronization patterns in N opportunities (one opportunity per S-ISCH), the fade detection (FD) module 268 of the mobile radio 102 starts the fade timer 265 at 775. The variables T and N are chosen to minimize the amount of time the mobile radio 102 spends on the voice channel when the call has actually ended, and maximize the probability that the mobile radio 102 will not leave the voice channel when a viable call is still in progress. The method 700 then loops back to 735.

Fade Recovery

At the blocks within process 703, the fade recovery (FR) module 269 of the mobile radio 102 performs fade recovery. When method 700 begins, the fade recovery (FR) module 269 of the mobile radio 102 continuously determines whether a SACCH/FACCH burst was successfully decoded at 777. When the fade recovery (FR) module 269 of the mobile radio 102 determines that a SACCH/FACCH burst was successfully decoded (at 777), the method 700 proceeds to 779 and 780.

At 779, the fade recovery (FR) module 269 of the mobile radio 102 stops and resets the fade timer 265 at 779, and the method 700 loops back to 777. When the mobile radio 102 stops and resets the fade timer 265 at 779, the mobile radio 102 has recovered from the fade condition. The fade timer 265 is reset so that it will start at the beginning when it starts again.

At 780, the mobile radio 102 clears the missed synchronization detection entries in the S-ISCH synchronization register (SR) 264/665 (e.g., sets M=0). In other words, when the mobile radio 102 decodes a SACCH/FACCH burst (yes at 777), the mobile radio 102 resets its count (M) of missed S-ISCH synchronization patterns.

Referring again to process 701, it is noted that if the mobile radio 102 does not decode a SACCH/FACCH burst at 777 before the fade timer expires (yes at 710), the mobile radio 102 switches to the control channel at 785, and the processes 701, 702, 703 will terminate.

Although FIGS. 2B and 7 illustrate embodiments where a fade protection module 260 and where a method 700 for ongoing fade protection utilize the S-ISCH to perform fade detection at 702, those skilled in the art will appreciate that in accordance with other embodiments the fade protection module 260 and the method 700 can utilize the I-ISCH to perform fade detection at block 702.

Thus, a number of radio link maintenance methods are disclosed that are not only reliable, but are also fast and relatively insensitive to fringe RF conditions so that the mobile can quickly detect conditions that indicate when a call has ended. This way, the call can be terminated quickly enough to maintain the desired quality of service while minimizing the probability that a viable call on the fringe of coverage is terminated.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for maintaining a radio link at a mobile radio that is configured to receive bursts transmitted from infrastructure equipment in time slots over an outbound traffic channel, the method comprising:
   starting a synchronization acquisition timer at the mobile radio upon receiving a first burst;
   monitoring, at the mobile radio, frame synchronization with the outbound traffic channel;
   instructing a switch to a control channel to attempt to become synchronized with frame timing when the mobile radio determines, based on a logical Inter-slot Signaling Channel, that a number of incorrect frame synchronization entries presently stored in a frame synchronization register is greater than or equal to a first threshold and determines that ultraframe synchronization has not been re-acquired before the synchronization acquisition timer expires, switching, at the mobile radio, to a control channel, and
   starting a fade timer at the mobile radio, when a fade condition is detected, to begin timing the duration of the fade condition;
   continuously determining whether the fade timer has expired at the mobile radio;
   stopping and resetting the fade timer, at the mobile radio when the mobile radio successfully decodes a Slow Access Control Channel burst or a Fast Access Control Channel burst; and
   switching to the control channel at the mobile radio when the mobile radio determines that the fade timer has expired.

2. A method according to claim 1, wherein the monitoring frame synchronization with the outbound traffic channel, comprises:
   verifying, at the mobile radio, ultraframe synchronization by determining whether a known synchronization pattern of the logical Inter-slot Signaling Channel is detected that is consistent with ultraframe synchronization; and
   stopping and resetting the synchronization acquisition timer, at the mobile radio, when the mobile radio determines that the known synchronization pattern is detected that is consistent with ultraframe synchronization.

3. A method according to claim 2, wherein the logical Inter-slot Signaling Channel comprises: an Information Inter-slot Signaling Channel (I-ISCH) that indicates a voice channel number of a subsequent burst, a location of the logical Inter-slot Signaling Channel in a superframe and a location of a current superframe within an ultraframe, and wherein the monitoring further comprises:
   determining, at the mobile radio based on the logical Information Inter-slot Signaling Channel (I-ISCH), whether the mobile radio is synchronized with the infrastructure equipment.

4. A method according to claim 3, wherein the determining, at the mobile radio based on the logical Information Inter-slot Signaling Channel (I-ISCH), whether the mobile radio is synchronized with the infrastructure equipment, comprises:
   maintaining, at the mobile radio, a frame synchronization register that stores a first number of frame synchronization entries detected in a last number of frame synchronization opportunities, wherein each frame synchronization entry is either an incorrect frame synchronization result or a correct frame synchronization result;
   removing an oldest frame synchronization result from the frame synchronization register, at the mobile radio, each time the mobile radio receives a time slot from the infrastructure equipment that has the logical Information Inter-slot Signaling Channel (I-ISCH);
   predicting, at the mobile radio for each time slot that is received from the infrastructure equipment and has the logical Information Inter-slot Signaling Channel (I-ISCH), a predicted voice channel number, a predicted ultraframe count and a predicted I-ISCH location of that particular time slot in a superframe;
   detecting, at the mobile radio, for each time slot that is received from the infrastructure equipment and has the logical Information Inter-slot Signaling Channel (I-ISCH), a detected voice channel number, a detected ultraframe count and a detected I-ISCH location of that particular time slot in a superframe;
   determining, at the mobile radio, whether the detected voice channel number, the detected ultraframe count and the detected I-ISCH location in the superframe are consistent with predicted voice channel number, the predicted ultraframe count and the predicted I-ISCH location in the superframe; and adding a newest frame synchronization result as a first entry in the frame synchronization register at the mobile radio, wherein the newest frame synchronization result is:
a correct frame synchronization entry when the mobile radio determines that the detected voice channel number, the detected ultraframe count and the detected I-ISCH location in the superframe are consistent with a corresponding one of the predicted voice channel number, the predicted ultraframe count and the predicted I-ISCH location in the superframe, or
an incorrect frame synchronization entry when the mobile radio determines that one or more of the detected voice channel number, the detected ultraframe count and the detected I-ISCH location in the superframe are inconsistent with a corresponding one of the predicted voice channel number, the predicted ultraframe count and the predicted I-ISCH location in the superframe.

5. A method according to claim 4, further comprising:
determining, at the mobile radio, whether the first number of incorrect frame synchronization entries presently stored in the frame synchronization register is greater than or equal to a first threshold;
when the first number of incorrect frame synchronization entries presently stored in the frame synchronization register is determined to be greater than or equal to the first threshold, restarting the synchronization acquisition timer and verifying ultraframe synchronization by determining whether a known synchronization pattern of the logical Inter-slot Signaling Channel is detected that is consistent with ultraframe synchronization; and
when the first number of incorrect frame synchronization entries presently stored in the frame synchronization register is determined to be less than the first threshold, continuing to determine, at the mobile radio based on a next logical Information Inter-slot Signaling Channel (I-ISCH), whether the mobile radio remains synchronized to the infrastructure equipment over the outbound traffic channel.

6. A method according to claim 1, wherein the synchronization acquisition timer specifies an amount of time that the mobile radio is permitted to acquire synchronization with the traffic channel of the base station, and wherein the synchronization acquisition timer continues to run until the synchronization acquisition timer expires or until the synchronization acquisition timer is stopped and reset.

7. A method according to claim 1, wherein the mobile radio switches to the control channel to attempt to become synchronized with the ultraframe timing.

8. A method according to claim 1, wherein the mobile radio is configured to receive Slow Access Control Channel bursts in one or more of the time slots transmitted from the infrastructure equipment over an outbound traffic channel, and further comprising:
counting, at the mobile radio, a first number of scrambled Slow Access Control Channel burst decoding opportunities;
decoding, at the mobile radio, the scrambled Slow Access Control Channel bursts; and
counting, at the mobile radio, a second number of the scrambled Slow Access Control Channel bursts that were successfully decoded.

9. A method according to claim 8, further comprising:
switching to the control channel, at the mobile radio, when the mobile radio determines that decoding of a current scrambled Slow Access Control Channel burst was unsuccessful, and that the first number of scrambled Slow Access Control Channel burst decoding opportunities is greater than or equal to a second threshold.

10. A method according to claim 9, further comprising:
switching to the control channel, at the mobile radio, when the mobile radio determines that decoding of the current scrambled Slow Access Control Channel burst was successful, that the second number of the scrambled Slow Access Control Channel bursts is less than a third threshold, and that the first number of scrambled Slow Access Control Channel burst decoding opportunities is greater than or equal to the second threshold.

11. A method according to claim 10, wherein the mobile radio switches to the control channel to correct a scrambling sequence mismatch between a scrambling sequence of the mobile radio and another scrambling sequence of the infrastructure equipment.

12. A method according to claim 1, wherein the mobile radio is configured to receive Slow Access Control Channel bursts and Fast Access Control Channel bursts in some of the time slots transmitted from the infrastructure equipment over an outbound traffic channel.

13. A method according to claim 12, wherein the stopping and resetting the fade timer at the mobile radio when the mobile radio successfully decodes that a Slow Access Control Channel burst or a Fast Access Control Channel burst, comprises:
continuously determining, at the mobile radio, whether a Slow Access Control Channel burst or a Fast Access Control Channel burst has been successfully decoded;
stopping and resetting the fade timer, at the mobile radio, when a Slow Access Control Channel burst or a Fast Access Control Channel burst has been successfully decoded.

14. A method according to claim 13, wherein the logical Inter-slot Signaling Channel comprises synchronization data having a known synchronization pattern, and further comprising:
maintaining, at the mobile radio, a synchronization register that stores a number of synchronization pattern detection entries that have occurred in a last number of synchronization pattern detection opportunities, wherein a synchronization pattern detection opportunity occurs when the mobile radio attempts to detect a known synchronization pattern in a time slot that includes the logical Inter-slot Signaling Channel, and wherein each synchronization pattern detection entry is either a missed synchronization pattern detection entry when the mobile radio is unable to detect a known synchronization pattern in a time slot that includes the logical Inter-slot Signaling Channel, or a successful synchronization pattern detection entry when the mobile radio is able to detect a known synchronization pattern in a time slot that includes the logical Inter-slot Signaling Channel, and wherein the synchronization register includes a number of missed synchronization pattern detection entries that have occurred in a last number of synchronization detection opportunities.

15. A method according to claim 1, wherein the step of determining whether a fade condition is detected, comprises:
each time a time slot that includes the logical Inter-slot Signaling Channel is received, removing the last synchronization pattern detection entry from the ISCH synchronization register at the mobile radio, and searching for a known synchronization pattern in the time slot that includes the logical Inter-slot Signaling Channel at the mobile radio;

adding a missed synchronization pattern detection entry to the synchronization register at the mobile radio when the mobile radio is unable to detect a known synchronization pattern in a time slot that includes the logical Inter-slot Signaling Channel such that the synchronization register includes a number of missed synchronization pattern detection entries that have occurred in a last number of synchronization detection opportunities;

adding a successful synchronization pattern detection entry to the synchronization register at the mobile radio when the mobile radio is able to detect a known synchronization pattern in a time slot that includes the logical Inter-slot Signaling Channel;

determining, at the mobile radio, whether the number of missed synchronization pattern detection entries that is presently stored in the synchronization register is greater than or equal to a fourth threshold; and starting the fade timer at the mobile radio to indicate detection of a fade condition when the number of missed synchronization pattern detection entries that is presently stored in the synchronization register is greater than or equal to the fourth threshold.

16. A method according to claim 15, further comprising: when a Slow Access Control Channel burst or a Fast Access Control Channel burst has been successfully decoded, clearing all of the number of missed synchronization pattern detection entries that are presently stored in the synchronization register at the mobile radio.

17. A mobile radio, comprising:
a receiver that is configured to receive bursts transmitted from infrastructure equipment over an outbound traffic channel;
a synchronization module, comprising:
    a synchronization acquisition timer, wherein the synchronization module is configured to start the synchronization acquisition timer upon receiving a first burst,
    a frame synchronization monitor module that is configured to monitor frame synchronization with the outbound traffic channel, and is configured to instruct the receiver to switch to a control channel to attempt to become synchronized with frame timing when the synchronization module determines, based on a logical Inter-slot Signaling Channel, that a number of incorrect frame synchronization entries presently stored in a frame synchronization register is greater than or equal to a first threshold and determines that ultraframe synchronization is not re-acquired before the synchronization acquisition timer expires;
a fade protection module, comprising:
    a fade detection module that is configured to start a fade timer when a fade condition is detected to begin timing the duration of the fade condition, wherein the fade detection module is configured to continuously determine whether the fade timer has expired, and is configured to instruct the receiver to switch to the control channel when the fade timer has expired; and
    a fade recovery module that is configured to stop and reset the fade timer when the fade recovery module successfully decodes a Slow Access Control Channel burst or a Fast Access Control Channel burst.

18. A mobile radio according to claim 17, further comprising:
a scrambling sequence checker module, comprising:
    a decoder configured to decode scrambled Slow Access Control Channel bursts;
    a counter configured to count a first number of scrambled Slow Access Control Channel burst decoding opportunities, and count a second number of the scrambled Slow Access Control Channel bursts that were successfully decoded; and
    a scrambling sequence processor that is configured to instruct the receiver to switch to the control channel to correct a scrambling sequence mismatch between a scrambling sequence of the mobile radio and another scrambling sequence of the infrastructure equipment when the scrambling sequence processor determines that:
        (1) a current scrambled Slow Access Control Channel burst was unsuccessfully decoded, and that the first number of scrambled Slow Access Control Channel burst decoding opportunities is greater than or equal to a second threshold, or
        (2) the current scrambled Slow Access Control Channel burst was successfully decoded, that the second number of the scrambled Slow Access Control Channel bursts is less than a third threshold, and that the first number of scrambled Slow Access Control Channel burst decoding opportunities is greater than or equal to the second threshold.

19. A mobile radio according to claim 17, wherein the logical Inter-slot Signaling Channel comprises synchronization data having a known synchronization pattern, and wherein the fade protection module further comprises:
    a synchronization register that is configured to store a number of synchronization pattern detection entries that have occurred in a last number of synchronization pattern detection opportunities,
    wherein a synchronization pattern detection opportunity occurs when the mobile radio attempts to detect a known synchronization pattern in a time slot that includes the logical Inter-slot Signaling Channel, and
    wherein each synchronization pattern detection entry is either a missed synchronization pattern detection entry when the mobile radio is unable to detect a known synchronization pattern in a time slot that includes the logical Inter-slot Signaling Channel, or a successful synchronization pattern detection entry when the mobile radio is able to detect a known synchronization pattern in a time slot that includes the logical Inter-slot Signaling Channel, and
    wherein the synchronization register includes a number of missed synchronization pattern detection entries that have occurred in a last number of synchronization detection opportunities.

20. A mobile radio according to claim 19, wherein the fade detection module comprises a fade detection processor that is configured to remove the last synchronization pattern detection entry from the synchronization register each time a time slot that includes the logical Inter-slot Signaling Channel is received, and that is configured to search for a known synchronization pattern in the time slot that includes the logical Inter-slot Signaling Channel,
    wherein the fade detection processor is configured to add a successful synchronization pattern detection entry to the synchronization register when the mobile radio is able to detect a known synchronization pattern in a time slot that includes the logical Inter-slot Signaling Channel, and is configured to add a missed synchronization pattern detection entry to the synchronization register when the mobile radio is unable to detect a known synchronization pattern in a time slot that includes the logical Inter-slot Signaling Channel such that the synchronization register includes a number of missed synchronization pattern detection entries that have occurred in a last number of synchronization detection opportunities, wherein the fade detection processor is configured to determine whether the number of missed synchronization pattern detection entries that is presently stored in the synchronization register is greater than or equal to a fourth threshold, and is configured to start the fade timer to indicate detection of a fade condition when the number of missed synchronization pattern detection entries that is presently stored in the synchronization register is greater than or equal to the fourth threshold.

* * * * *